(12) United States Patent
Devolites et al.

(10) Patent No.: US 7,720,206 B2
(45) Date of Patent: May 18, 2010

(54) SYSTEM AND METHOD FOR INTELLIGENT DATA EXTRACTION FOR TELECOMMUNICATIONS INVOICES

(75) Inventors: John A. Devolites, Oakton, VA (US); Roman Cybyk, Fairfax, VA (US); John Wyatt, Fairfax, VA (US)

(73) Assignee: TEOCO Corporation, Fairfax, VA (US)

( * ) Notice: Subject to any disclaimer, the term of this patent is extended or adjusted under 35 U.S.C. 154(b) by 1065 days.

(21) Appl. No.: 11/333,537

(22) Filed: Jan. 18, 2006

(65) Prior Publication Data

US 2007/0165801 A1 Jul. 19, 2007

(51) Int. Cl.
*H04M 15/00* (2006.01)
(52) U.S. Cl. .............. 379/126; 379/114.01; 379/114.04
(58) Field of Classification Search ............... 379/111, 379/112.01, 114.01, 115.01, 116, 126, 133–136, 379/114.03, 114.04; 455/405–408; 705/52–53, 705/34
See application file for complete search history.

(56) References Cited

U.S. PATENT DOCUMENTS

| | | | |
|---|---|---|---|
| 5,325,290 A * | 6/1994 | Cauffman et al. ............. | 705/34 |
| 6,385,301 B1 | 5/2002 | Nolting et al. | |
| 6,411,681 B1 | 6/2002 | Nolting et al. | |
| 6,721,405 B1 | 4/2004 | Nolting et al. | |
| 6,731,730 B1 | 5/2004 | Zolotov | |
| 6,891,938 B1 | 5/2005 | Scott et al. | |
| 6,904,276 B1 * | 6/2005 | Freeman et al. ............. | 455/406 |
| 7,231,024 B2 | 6/2007 | Moisey et al. | |
| 7,286,647 B2 * | 10/2007 | Stormon et al. .......... | 379/32.01 |
| 7,340,422 B2 * | 3/2008 | Fisher ......................... | 705/30 |
| 2004/0049738 A1 | 3/2004 | Thompson et al. | |
| 2004/0153382 A1 * | 8/2004 | Boccuzzi et al. ............. | 705/34 |

* cited by examiner

*Primary Examiner*—Quoc D Tran
(74) *Attorney, Agent, or Firm*—Venable LLP; Jeffri A. Kaminski; Todd R. Farnsworth

(57) ABSTRACT

A system, method and computer program product for extracting information from a telecommunications invoice is provided. According to an exemplary embodiment of the present invention, a method may include: receiving a telecommunications invoice data stream in a first data format; analyzing the telecommunications invoice data stream to determine the first data format; modeling the telecommunications invoice data stream; and mapping the modeled telecommunications invoice data stream to a normalized data format. According to another exemplary embodiment of the present invention, the method may include: where the modeling of the telecommunications invoice data stream may further include any of: creating a model for the first data format; modeling the telecommunications invoice data stream according to the model; and/or modeling the telecommunications invoice data stream with an intelligent adapter.

44 Claims, 5 Drawing Sheets ized invoices from many different individual telecommunications service providers. Individual large companies may also receive many telecommunications services invoices for their

SYSTEM AND METHOD FOR INTELLIGENT DATA EXTRACTION FOR TELECOMMUNICATIONS INVOICES

BACKGROUND OF THE INVENTION

1. Field of the Invention

The present invention relates generally to invoices and, more particularly, to telecommunications invoices.

2. Related Art

Interconnection arrangements in the telecommunications industry have a long history. Interconnection first became a contractual issue in 1894 when Alexander Graham Bell's initial patents expired. Beginning in 1894, the Bell System had to enter into interconnecting contracts with independent telephone companies, and the independent telephone companies similarly signed contracts with each other that governed the terms of interconnection.

Telecommunications legislation and regulatory actions in the past few decades in the United States has led to creation of a large number of incumbent local exchange carriers (ILECs), intra exchange carriers (IXCs), and competitive local exchange carriers (CLECs). Through a complex system of regulation, telephone calls are placed through these multi-vendor networks using the vast networks of cooperating companies.

In 1984, AT&T was broken up by antitrust regulators in the U.S., forming a network of local phone companies (the ILECs), and long distance companies (the IXCs). Following the breakup, initially each local loop was monopolized and run by a LEC, typically a Regional Bell Operating Company (RBOC) or an independent telephone company such as GTE. Excluding cellular phones, the local loop was a required input in the production of long distance services, and typically long distance companies did not have their own comparable local loop. In telecommunications, the use of a local exchange incurred charges to originate calls (access origination) or to terminate calls (access termination).

Passage of the Telecommunications Act of 1996, authorizing competition in the local phone service market, has permitted CLECs to compete with ILECs in providing local exchange services. This competition has created even more companies which may charge for origination or termination.

When a customer places a telephone call, the call may often originate onto an ILEC, may be transported over a network of the ILEC, and/or an IXC's network, and then may be terminated on an ILECs' facilities. If a call originates at an ILEC, is terminated onto a CLEC's facilities, and then is terminated, e.g., at an Internet Service Provider (ISP), then the ILEC owes the CLEC reciprocal compensation for the termination of the call. Thus, reciprocal compensation is basically a settlement mechanism for telephone traffic transferred between two local networks. This arrangement was pursuant to the FCC Interconnection Order. The money follows the calls. Most ISP calls are from users and terminated to ISPs. This potentially means a lot of money flowing from ILECs to CLECs who have ISPs as customers. The ISPs are considered "end users" pursuant to FCC rules, and therefore the call is considered a local call. If a call is considered a long distance transmission, then reciprocal compensation did not apply. Many ILECs may pay CLECs reciprocal compensation.

Because of the many origination and termination fees that are charged by telephone companies, an ILEC, for instance, can receive enormous numbers of often enormously sized invoices from many different individual telecommunications service providers. Individual large companies may also receive many telecommunications services invoices for their entities. The processing of telecommunications invoices which come from many different entities with largely non-uniform billing systems, can be an extremely costly process, which may be fraught with potential billing errors.

A telecommunications carrier may send and receive thousands of invoices each month. Most of these invoices between carriers may be electronic (perhaps 60-80% depending on the carrier). There are several structured industry formats for providing electronic invoices. The structured industry formats include CABS and SECAB formats which are maintained and improved by industry associations. However, many bills are not available in these formats.

Since most companies do not have the means to create separate custom tools to accept any non-standard input format, most carriers still obtain a large proportion of bills on printed paper. Indeed, many bills are still provided in printed form as a large paper document. The result is that every telecommunications carrier spends considerable manual effort to process, audit and pay thousands of manual invoices.

Processing paper invoices is extremely time-consuming and costly. The cost of creating loading programs and maintaining them for multiple carriers is also time consuming and costly. As a result, manual invoices are often paid without any automated auditing or detailed review. The lack of detailed review results in even higher costs and processing errors to telecommunications carriers.

SUMMARY OF THE INVENTION

The present invention sets forth various exemplary embodiments of systems, methods and computer program products for extracting telecommunications invoice data from an electronic data stream, modeling and mapping the telecommunications invoice data stream into a normalized data format.

According to an exemplary embodiment of the present invention, a method may include: receiving a telecommunications invoice data stream in a first data format; analyzing the telecommunications invoice data stream to determine the first data format; modeling the telecommunications invoice data stream; and mapping the modeled telecommunications invoice data stream to a normalized data format.

According to another exemplary embodiment of the present invention, the method may include: where the modeling of the telecommunications invoice data stream further may include at least one of: creating a model for the first data format; modeling the telecommunications invoice data stream according to the model; and/or modeling the telecommunications invoice data stream with an intelligent adapter.

In yet another exemplary embodiment of the present invention, the method may further include: validating the parsed data by comparing a first telecommunications invoice generated from the telecommunications invoice data stream in the first data format with a second telecommunications invoice generated from the mapped telecommunications invoice data stream.

According to an exemplary embodiment of the present invention, the method may further include: auditing the telecommunications invoice printer data stream for billing accuracy may include at least one of: comparing telecommunications invoice charges with telecommunications invoice total cost included in the telecommunications invoice data stream; confirming field integrity; confirming numerical accuracy; and/or confirming expected field lengths.

According to an exemplary embodiment of the present invention, the method may include where the received telecommunications invoice data stream may include at least one of a non-industry standard data format and/or a captured electronic print data file.

According to an exemplary embodiment of the present invention, the method may include where the captured electronic print data file is captured at a remote site.

According to an exemplary embodiment of the present invention, the method may include where the telecommunications invoice data stream may include a electronic print data file of a telecommunications invoice.

According to an exemplary embodiment of the present invention, the method may include where the telecommunications invoice data stream may include a company telecommunications invoice data stream.

According to an exemplary embodiment of the present invention, the method may include where the first data format may include at least one of a non-industry standard data file, a PDF file, a PRN file, an LPT file, and/or a TIFF file.

According to an exemplary embodiment of the present invention, the method may include where the normalized data format may include at least one of an XTrak interchange format (xif), an extensible markup language (xml) format, an industry standard format, and/or a proprietary format.

According to an exemplary embodiment of the present invention, the method may include the step of mapping the modeled invoice data further may include at least one of: mapping the modeled telecommunications invoice data stream according to mapping codes; mapping the modeled telecommunications invoice data stream with an intelligent adapter; blending a record into a record may include a superset of fields of an industry standard record and/or mapping the modeled telecommunications invoice data stream using fuzzy logic.

According to an exemplary embodiment of the present invention, the method may include where the received telecommunications invoice data stream is received at a centralized site from a remote site.

According to an exemplary embodiment of the present invention, the method may further include: transmitting the mapped telecommunications invoice data stream to a centralized site from a remote site.

According to an exemplary embodiment of the present invention, the method may include the first data format, which may include at least one of: usage records; facilities records; switched call records; dedicated facilities records; call detail records (CDRs); facility cost records (FCRs); voice over Internet Protocol (VoIP) records; packet records; content records; ringtone records; audio records; video records; broadcast records; wireless records; CATV records; satellite records; other usage records; other facility records; and/or other charge records.

According to an exemplary embodiment of the present invention, a machine-readable medium may include providing instructions, which when executed by a computing platform, may cause the computing platform to perform operations, which may include a method, which may include: receiving a telecommunications invoice data stream in a first data format; analyzing the telecommunications invoice data stream to determine the first data format; modeling the telecommunications invoice data stream; and mapping the modeled telecommunications invoice data stream to a normalized data format.

According to another exemplary embodiment of the present invention, the machine-readable medium may include where the modeling of the telecommunications invoice data stream further may include at least one of: creating a model for the first data format; modeling the telecommunications invoice data stream according to the modeling model; and/or modeling with an intelligent adapter the telecommunications invoice data stream.

According to another exemplary embodiment of the present invention, the machine-readable medium may include where the method further may include: validating the parsed data by comparing a first telecommunications invoice generated from the telecommunications invoice data stream in the first data format with a second telecommunications invoice generated from the mapped telecommunications invoice data stream.

According to another exemplary embodiment of the present invention, the machine-readable medium may include where the method further may include: auditing the telecommunications invoice printer data stream for billing accuracy may include at least one of: comparing telecommunications invoice charges with telecommunications invoice total cost included in the telecommunications invoice data stream; confirming field integrity; confirming numerical accuracy; and/or confirming expected field lengths.

According to another exemplary embodiment of the present invention, the machine-readable medium may include where the received telecommunications invoice data stream may include a captured electronic print file.

According to another exemplary embodiment of the present invention, the machine-readable medium may include where the captured electronic print file is captured at a remote site.

According to another exemplary embodiment of the present invention, the machine-readable medium may include where the telecommunications invoice data stream may include a electronic print file of a telecommunications invoice.

According to another exemplary embodiment of the present invention, the machine-readable medium may include where the telecommunications invoice data stream may include a company telecommunications invoice data stream.

According to another exemplary embodiment of the present invention, the machine-readable medium may include where the first data format may include at least one of a non-industry standard file, a PDF file, a PRN file, an LPT file, and/or a TIFF file.

According to another exemplary embodiment of the present invention, the machine-readable medium may include where the second normalized data format may include at least one of an XTrak interchange format (xif), an extensible markup language (xml) format, an industry standard format, and/or a proprietary format.

According to another exemplary embodiment of the present invention, the machine-readable medium may include where the step of mapping the parsed invoice data further may include at least one of: mapping the modeled telecommunications invoice data stream according to mapping codes; mapping the modeled telecommunications invoice data stream with an intelligent adapter; blending a record into a record may include a superset of fields of an industry standard record and/or mapping the modeled telecommunications invoice data stream using fuzzy logic.

According to another exemplary embodiment of the present invention, the machine-readable medium may include where the received telecommunications invoice data stream is received at a centralized site from a remote site.

According to another exemplary embodiment of the present invention, the machine-readable medium may include where the method further may include: transmitting the mapped telecommunications invoice data stream to a centralized site from a remote site.

According to an exemplary embodiment of the present invention, a system may include: receiving means for receiving a telecommunications invoice data stream in a first data format; analyzing means for analyzing the telecommunications invoice data stream to determine the first data format; modeling means for modeling the telecommunications invoice data stream; and mapping means for mapping the modeled telecommunications invoice data stream to a normalized data format.

According to another exemplary embodiment of the present invention, the system may include where the modeling means further may include: means for creating a modeling model for the first data format; means for modeling the telecommunications invoice data stream according to the modeling model; means for blending a record into a record may include a superset of fields of an industry standard record; and/or means for modeling the telecommunications invoice data stream with an intelligent adapter.

According to another exemplary embodiment of the present invention, the system may further include: means for validating the parsed data by comparing a first telecommunications invoice generated from the telecommunications invoice data stream in the first printer data stream format with a second telecommunications invoice generated from the mapped telecommunications invoice data stream.

According to another exemplary embodiment of the present invention, the system may further include: means for auditing the telecommunications invoice printer data stream for billing accuracy may include at least one of: means for comparing telecommunications invoice charges with telecommunications invoice total cost included in the telecommunications invoice data stream; means for confirming field integrity; means for confirming numerical accuracy; and/or means for confirming expected field lengths.

According to another exemplary embodiment of the present invention, the system may include where the received telecommunications invoice data stream may include a captured electronic print file.

According to another exemplary embodiment of the present invention, the system may include where the captured electronic print file is captured at a remote site.

According to another exemplary embodiment of the present invention, the system may include where the telecommunications invoice data stream may include a electronic print file of a telecommunications invoice.

According to another exemplary embodiment of the present invention, the system may include where the telecommunications invoice data stream may include a company telecommunications invoice data stream.

According to another exemplary embodiment of the present invention, the system may include where the first printer data stream format may include at least one of a non-industry standard format, a PDF file, a PRN file, an LPT file, and/or a TIFF file.

According to another exemplary embodiment of the present invention, the system may include where the second normalized data format may include at least one of an XTrak interchange format (xif), an extensible markup language (xml) format, an industry standard format, and/or a proprietary format.

According to another exemplary embodiment of the present invention, the system may include where the mapping means further may include at least one of: means for mapping the modeled telecommunications invoice data stream according to mapping codes; means for mapping the modeled telecommunications invoice data stream with an intelligent adapter; and/or means for mapping the modeled telecommunications invoice data stream using fuzzy logic.

According to another exemplary embodiment of the present invention, the system may include where the received telecommunications invoice data stream is received at a centralized site from a remote site.

According to another exemplary embodiment of the present invention, the system may further include: means for transmitting the mapped telecommunications invoice data stream to a centralized site from a remote site.

BRIEF DESCRIPTION OF THE FIGURES

Various exemplary features and advantages of the invention will be apparent from the following, more particular description of exemplary embodiments of the present invention, as illustrated in the accompanying drawings wherein like reference numbers generally indicate identical, functionally similar, and/or structurally similar elements. The left most digits in the corresponding reference number indicate the drawing in which an element first appears.

DETAILED DESCRIPTION OF VARIOUS EXEMPLARY EMBODIMENTS OF THE INVENTION

Figure 1:
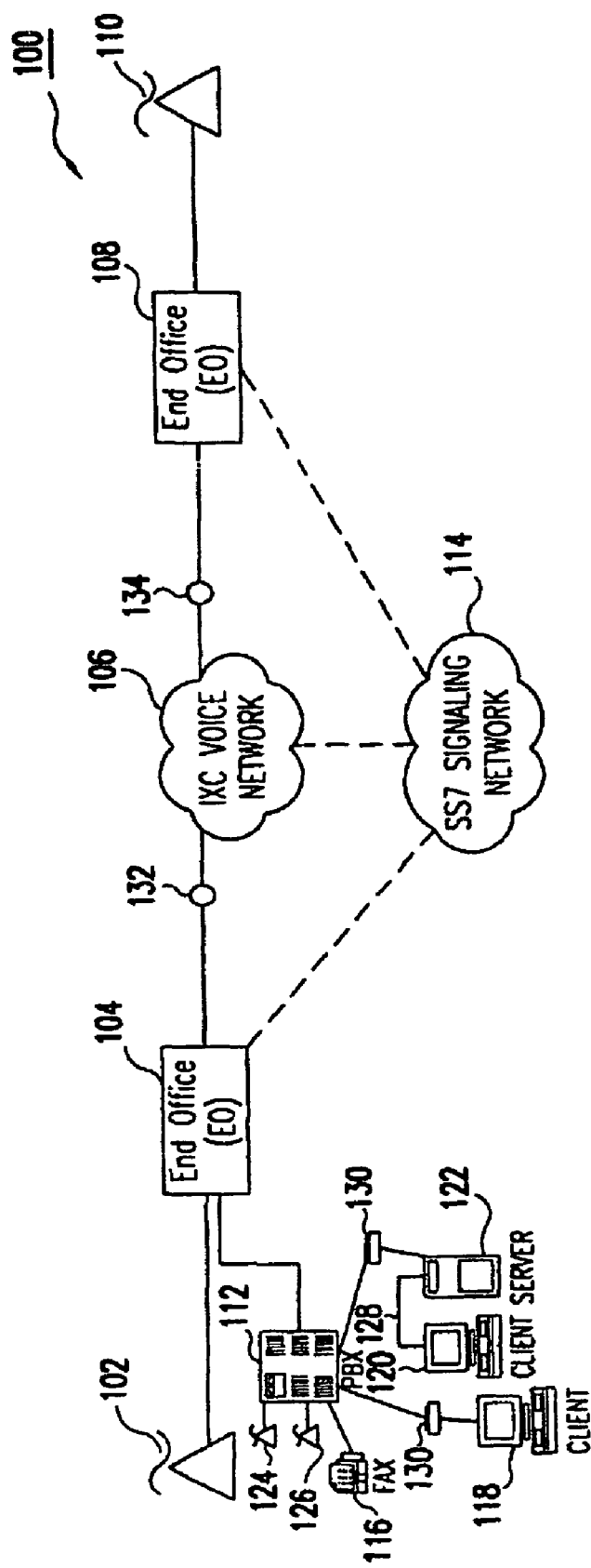
FIG. 1 is an exemplary embodiment of a block diagram providing an overview of an exemplary telecommunications network providing exemplary local exchange carrier (LECs) services within one or more local access and transport areas (LATAs)

A preferred exemplary embodiment of the invention is discussed in detail below. While specific exemplary embodiments are discussed, it should be understood that this is done for illustration purposes only. A person skilled in the relevant art will recognize that other components and configurations may be used without parting from the spirit and scope of the invention.

Overview of the Invention

An exemplary embodiment of the present invention represents a process and software adapted to convert a telecommunications invoice and/or contract information from a large number of dissimilar formats into a single, unified, proprietary format, the *.xif format. The XTrak. Interchange format (XIF) *.xif format (also, XIF™) is a proprietary format available from TEOCO Corporation of Fairfax, Va., USA.

In addition to the structured industry formats CABS and SECAB, there may be other proprietary output formats of the sending carrier's billing systems. Examples of formats which are not the structured industry formats may include, e.g., but are not limited to: PDF, XML, PRN, Text, Excel spreadsheet format, DBF, MDB, RTF, TIFF, Word and electronic data interchange (EDI) formats. These formats require the receiving carrier to spend significant resources to process these files and to write loading programs for each file received. As a result of the effort required, most carriers opt to receive the paper version of the invoice rather than invest the IT resources necessary to create the loading programs to be able to access the non-industry formats.

The XTrak system available from TEOCO Corporation, according to an exemplary embodiment of the present invention, takes the burden of converting non-standard invoice formats off the telecommunications carrier. The exemplary embodiment of the present invention processes dissimilar formats into a single proprietary format known as XIF™ (XTrak Interchange Format). From this format, licensees of XTrak need only one loading program for all dissimilar input formats.

According to an exemplary embodiment of the present invention, first, a person with a detailed understanding of the Telecommunication Industry data and formats may analyze the different input formats and may determine the appropriate mapping the different input formats into the XIF format. The mapping process, according to an exemplary embodiment may include a process incorporating human intelligence and a working knowledge of industry standards.

Second, once the mapping is complete, an intelligent adapter may be created that may parse data out of a carrier specific format, may perform field integrity validations, and may place the information into the XIF database. The modeling program can recognize and adjust to different field locations, currencies and languages. Third, once the invoice data stream is in the XIF database, then, e.g., but not limited to, invoice and contractual data can be extracted for analysis and auditing.

According to an exemplary embodiment, XTrak may reduce carrier costs and may improve analysis, by providing a more detailed analysis of information than previously accessible to a carrier. Intelligent adapters may accelerate the process of data extraction by moving from the classic way of writing line by line parsing programs, and by moving to creating data models which hunt for the appropriate data in a file. The result is a much faster development cycle to create adaptors for the wide variety of carrier files.

According to an exemplary embodiment of the present invention, XTrak may use the latest multi-processing technologies to allow for processing of large files (greater than 1 million records) in minutes.

Figure 4:
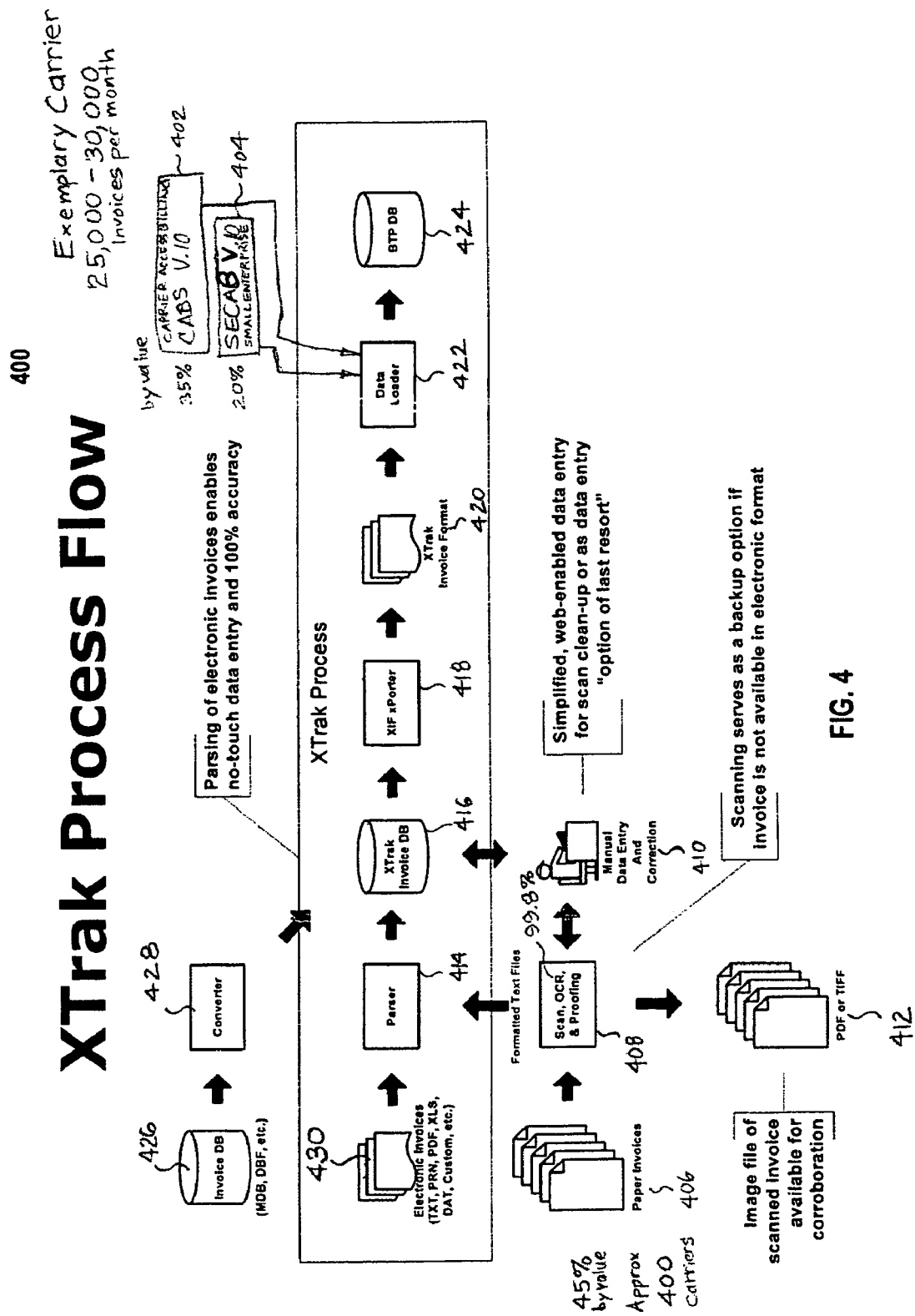
FIG. 4 depicts an exemplary embodiment of a block diagram of an XTrak invoice process according to an exemplary embodiment of the present invention.

FIG. 4 depicts an exemplary embodiment of the XTrak Process Flow 400, according to an exemplary embodiment of the present invention. In an exemplary embodiment, an exemplary telecommunications carrier may process 25,000 to 30,000 invoices per month. An exemplary distribution by value of invoices may include 35% of Carrier Access Billing (CABS) format electronic bills 402, (in an exemplary embodiment, the bills may be CABS v.10), 20% Small Enterprise CABS format bills 404, (in an exemplary embodiment, the bills may be SECAB v.10). Examples of industry standard invoice formats are included in Table 2 below. The remaining 45% of the invoices, by value, of the invoices of the exemplary telecommunications carrier, related to approximately 400 carriers, generally provide paper invoices 406.

In an exemplary embodiment, in order to audit the invoices and to review the invoices for any errors, a system such as, e.g., but not limited to, Bill Trak Pro (BTP), available from TEOCO Corporation of Fairfax, Va., USA. The BTP system may include a BTP database 424, as shown. In order to load data into the BTP system, data must be loaded into the BTP DB 424. Industry standard invoices such as, e.g., but not limited to, EDI, CABS 402 and SECAB 404, etc. formatted data may be loaded into BTP DB 424 using an appropriate data loader 422. Unfortunately, invoice standards such as, CABS 402 and SECAB 404 continually change, and sometimes, a billing system may not use the latest industry standard format, thus even industry standard invoices may not always be easily loaded into an auditing system. Unfortunately, paper invoices also may not be loaded into a billing auditing system. Non-standard electronic invoices, conventionally may also not be imported into the BTP DB 424 bill auditing system. For most non-standard invoice formats, there is no individual data loader 422 to load the invoice data. Further, for paper invoices 406, the invoices conventionally must be scanned, the data must be recognized using, e.g., but not limited to, an optical character recognition (OCR) system, and then the results of the recognition must be proofread, since OCR conventionally is only 99.8% accurate. Although 99.8% accuracy may sound very accurate, in the case of invoice data, this level of accuracy is unacceptable, and only 100% accuracy is acceptable. For example, OCR cannot distinguish between a lower case L (l), a number one (1), a capital I. Also, OCR cannot distinguish between a zero and the letter O. Telecommunications invoices are all numbers (e.g., dollar amounts), and words, so they are difficult for OCR programs to figure out. Also, telecom invoice data amounts can be large dollar values, so one wrong digit, or a misplaced decimal point can make a big difference. Thus, any scanning and OCR of an invoice requires manual intervention. Thus, conventionally, only face pages of invoices are scanned, i.e., the first page of a bill (without any detail), and then the results of scanning, OCR and proofing 408, are required to be corrected using manual data entry and correction 410. If one only scans the face page of a bill, then payment of the paper invoice may be possible, however, almost no auditing is possible with only a face page of an invoice. Unfortunately, if one scans only the face page of an invoice, much of the invoice's information is lost and the bill auditing system then is unable to fully audit the bill.

According to an exemplary embodiment of the present invention, the print data streams of the paper invoices 406 of the 400 carriers may be intercepted and stored, prior to printing. These print data stream invoices may be thought of as quasi-electronic invoices 430, in the print data stream format. Conventional printer data stream formats may include, e.g., but not limited to, TXT, PRN, PDF, XLS, DAT, Custom formats, proprietary billing system output formats, etc. Exemplary print datastream formats appear below in Table 1. The printer datastream format electronic invoices 430 may be parsed using a parser 414 to break the data into an XTrak Invoice database 416 format, according to an exemplary embodiment of the present invention. The modeling process, according to an exemplary embodiment of the present invention may include building a modeling model using a datamining tool such as, e.g., but not limited to, a DATAWATCH® MONARCH PRO product data mining tool to map the input invoice print datastream format into a proprietary XTrak database format (XIF) format. The modeling model may be created using the datamining tool, and the mapped data may be cleaned up, and validated, using software, and/or manual data entry or correction 410, as shown. Once the modeling model has been created for a given input datastream format, then the invoice data may be mapped into the XTrak invoice data model format 420. In addition, some invoices may be created using industry standard invoice database 426 format systems such as, e.g., but not limited to, MDB, DBF, etc., for such invoice databases 426, the invoice data may be converted using a converter 428 into an XTrak Invoice database 416, according to an exemplary embodiment of the present invention.

According to an exemplary embodiment, data from XTrak invoice database 416 may be exported using XIF xPorter 418 to generate an XTrak Invoice Format (XIF) normalized invoice for input into data loader 422. Normalization may include, in an exemplary embodiment, blending data records into a single record format. In an exemplary embodiment, data records may be blended into a record which may include a superset of fields of an industry standard data format. Exemplary records which may be blended, and/or mapped, according to an exemplary embodiment, may include usage records, facilities records, switched call records, dedicated facilities records, call detail records (CDRs), facility cost records (FCRs), voice over Internet Protocol (VoIP) records, packet records, content, ringtone, audio, video, broadcast, wireless, CATV, satellite and other usage, facility and/or other charges, etc. The XTrak invoice format (XIF) invoice is a proprietary invoice format which is a robust data structure including a super set of all invoice data from CABS, SECAB, non-industry standard invoice formats, proprietary invoice formats, and any custom data from customers. An exemplary XIF layout is included below in Table 3. XIF invoice format mapping is shown below in Table 4.

According to an exemplary embodiment of the present invention, the model may be fed into a database.

According to another exemplary embodiment, the modeling model, after being constructed, may be validated to check for errors. For example, if the modeling model breaks up components of a total, as well as the total, a sum of the components may be calculated and compared to the parsed total as a validation. The modeling validation process may identify billing errors. The billing auditing system may also identify billing errors.

According to another exemplary embodiment, a user may add map code to remap data for specific customer needs.

According to an exemplary embodiment, a customer may request to customize the XIF format to include additional fields of particular interest to a customer.

According to another exemplary embodiment, the XIF format may be mapped to convert data to another format such as, e.g., but not limited to, a standard billing format, a CABS format, a SECAB format, an EDI format (such as, e.g., but not limited to, an EDI 811), an extensible markup format (XML), etc.

Supported Input File Extensions

An exemplary embodiment of the present invention may accept any of the exemplary file extensions noted in Table 1, below:

TABLE 1

File Extensions Supported by Xtrak

| Extension | Source |
|---|---|
| .txt | ASCII text |
| .mdb | Microsoft |
| .tif | Tag image bitmap file (TIFF) |
| .xls | Microsoft ® Excel ® Spreadsheet |
| .dbf | A dBASE file, a format originated by Ashton-Tate |
| .pdf | Portable Document file (Adobe Acrobat) |
| .db | Borland ® Paradox ® 7 table database |
| .htm | A Web page (a file containing Hypertext Markup Language) |
| .prn | Windows Print File format |

In addition to the non-standard, print data file formats noted in Table 1, in an exemplary embodiment, the present invention may also accept certain standard industry formats including those noted in Table 2, below:

TABLE 2

Industry Standard Formats Supported by XTrak

| Format Name | Description |
|---|---|
| EDI 811 | EDI Telecommunications Billing (ETB) is an industry group comprised of representatives from telecommunications providers and customers. |
| Carrier Access Billing Specifications (CABS) | Carrier Access Billing System (Telcordia Technologies, Inc.) |
| Small Exchange Carrier Access Billing Specifications (SECAB) | Industry-created and agreed upon standards and guidelines for billing access charges within the telecommunications industry for small exchange carriers (SECs) |

According to an exemplary embodiment, the present invention may support any database system including, e.g., but not limited to, those available from Microsoft Corporation of Redmond, Wash., Oracle of Redwood Shores, Calif., IBM Corporation of Armonk, N.Y., Sybase of Dublin, Calif., Foxpro available from Microsoft, and Dbase available from data-Based Intelligence, Inc. of Vestal, N.Y. Of course these are merely examples of some common databases, and the present invention is equally applicable to any other available database, database management, or the like.

An exemplary embodiment of the XIF layout according to an exemplary embodiment of the present invention appears below in Table 3:

TABLE 3

XTrak Interchange Format (XIF) Layout

File Conventions

Delimiter = Tab.
Carriage Return used as end of line character.
Dollar Amounts should be rounded to (2) decimal places unless otherwise specified.
Credit Amounts sent through XIF are expected to contain a negative sign preceding the actual dollar value.

TABLE 3-continued

XTrak Interchange Format (XIF) Layout

| Record | Field Name | Data Type | Position | Min/Max | Required | Definition |
|---|---|---|---|---|---|---|
| HDR - Header Record (1 Occurrence per file) | | | | | | |
| HDR | RECORD_TYPE | STRING | 1 | 3/3 | Y | |
| HDR | FORMAT | STRING | 6 | 4/4 | Y | |
| HDR | VERSION | STRING | 7 | 1/12 | Y | |
| HDR | EXPORT_DATE | DATE | 8 | 10/10 | | |
| SUM - Summary Record (1 Occurrence per Invoice) | | | | | | |
| SUM | RECORD_TYPE | STRING | 1 | 3/3 | Y | |
| SUM | ACCT_NUM | STRING | 2 | 1/18 | Y | |
| SUM | MASTER_ACCT_NUM | STRING | 3 | 1/18 | | |
| SUM | INV_NUM | STRING | 4 | 1/50 | Y | |
| SUM | BILL_DATE | DATE | 5 | 10/10 | Y | |
| SUM | INV_CO_CODE | STRING | 6 | 1/4 | | |
| SUM | VENDOR_NAME | STRING | 7 | 1/35 | | |
| SUM | DATA_FILE_NAME | STRING | 8 | 1/80 | | |
| SUM | TRANSMIT_DATE | DATE | 9 | 8/8 | | |
| SUM | DUE_DATE | DATE | 10 | 8/8 | | |
| SUM | ICSC_CODE | STRING | 11 | 1/4 | | |
| SUM | INV_FROM_DATE | DATE | 12 | 8/8 | | |
| SUM | INV_THRU_DATE | DATE | 13 | 8/8 | | |
| SUM | SOURCE_TYPE | STRING | 14 | 1/5 | Y | |
| SUM | ACCT_TYPE | STRING | 15 | 1/35 | | |
| SUM | MIN_DUE | FLOAT | 16 | 1/11 | | |
| SUM | INV_MPB_IND | STRING | 17 | 1/1 | | |
| SUM | BAL_FORWARD_AMT | FLOAT | 18 | 1/11 | | |
| SUM | TOT_ADJ_AMT | FLOAT | 19 | 1/11 | | |
| SUM | TOT_LAST_AMT | FLOAT | 20 | 1/11 | | |
| SUM | TOT_LPC_AMT | FLOAT | 21 | 1/11 | | |
| SUM | TOT_MRC_AMT | FLOAT | 22 | 1/11 | | |
| SUM | TOT_OCC_AMT | FLOAT | 23 | 1/11 | | |
| SUM | TOT_PAYMENT_AMT | FLOAT | 24 | 1/11 | | |
| SUM | TOT_REG_FEE_AMT | FLOAT | 25 | 1/11 | | |
| SUM | TOT_REJECT_AMT | FLOAT | 26 | 1/11 | | |
| SUM | TOT_SURCHRG_AMT | FLOAT | 27 | 1/11 | | |
| SUM | TOT_TAX_AMT | FLOAT | 28 | 1/11 | | |
| SUM | TOT_USG_AMT | FLOAT | 29 | 1/11 | | |
| SUM | TOT_DUE_AMT | FLOAT | 30 | 1/11 | | |
| SUM | CURRENT_DUE_AMT | FLOAT | 31 | 1/11 | | |
| DTL - Detail Record (0 to many Occurrences per Invoice) | | | | | | |
| DTL | RECORD_TYPE | STRING | 1 | 3/3 | Y | |
| DTL | ACCT_NUM | STRING | 2 | 1/18 | Y | |
| DTL | INV_NUM | STRING | 3 | 1/50 | Y | |
| DTL | BILL_DATE | DATE | 4 | 10/10 | Y | |
| DTL | INV_CO_CODE | STRING | 5 | 1/4 | | |
| DTL | CHRG_TYPE | STRING | 6 | 3/3 | | |
| DTL | AUDIT_NUM | STRING | 7 | 1/30 | | |
| DTL | BIP | STRING | 8 | 3/3 | | |
| DTL | CELLULAR_USAGE_IND | STRING | 9 | 1/1 | | |
| DTL | CFA | STRING | 10 | 1/42 | | |
| DTL | CHRG_BASE_AMT | FLOAT | 11 | 1/11 | | |
| DTL | CHRG_BILLED_AMT | FLOAT | 12 | 1/11 | | |
| DTL | CHRG_CODE_TYPE | STRING | 13 | 1/20 | | |
| DTL | CHRG_CODE | STRING | 14 | 1/13 | | |
| DTL | CHRG_DESC | STRING | 15 | 1/80 | | |
| DTL | CHRG_DISC_AMT | FLOAT | 16 | 1/11 | | |
| DTL | CHRG_FED_TAX_AMT | FLOAT | 17 | 1/11 | | |
| DTL | CHRG_FROM_DATE | DATE | 18 | 8/8 | | |
| DTL | CHRG_MPB_IND | STRING | 19 | 1/1 | | |
| DTL | CHRG_REG_FEE_AMT | FLOAT | 20 | 1/11 | | |
| DTL | CHRG_SRV_EST_DATE | DATE | 21 | 8/8 | | |
| DTL | CHRG_ST_LCL_TAX_AMT | FLOAT | 22 | 1/11 | | |
| DTL | CHRG_SURCHRG_AMT | FLOAT | 23 | 1/11 | | |
| DTL | CHRG_THRU_DATE | DATE | 24 | 8/8 | | |
| DTL | CIC | STRING | 25 | 1/5 | | |
| DTL | CKT_SRV_EST_DATE | DATE | 26 | 8/8 | | |
| DTL | COMPLETION_DATE | DATE | 27 | 8/8 | | |
| DTL | CUST_NAME | STRING | 28 | 1/35 | | |
| DTL | DAYS_LATE | INTEGER | 29 | 1/3 | | |
| DTL | DIRECTIONALITY_IND | STRING | 30 | 1/1 | | |
| DTL | EC_CIRCUIT_ID | STRING | 31 | 1/53 | | |
| DTL | END_OFC_ID | STRING | 32 | 1/11 | | |
| DTL | IC_CIRCUIT_ID | STRING | 33 | 1/53 | | |
| DTL | JURISDICTION | STRING | 34 | 1/2 | | |

TABLE 3-continued

XTrak Interchange Format (XIF) Layout

| | | | | | |
|---|---|---|---|---|---|
| DTL | LATA | STRING | 35 | 3/5 | |
| DTL | LPIC | STRING | 36 | 1/10 | |
| DTL | MILEAGE | INTEGER | 37 | 1/9 | |
| DTL | MILEAGE_UNIT | STRING | 38 | 1/2 | |
| DTL | MRP1 | STRING | 39 | 1/11 | |
| DTL | MRP2 | STRING | 40 | 1/11 | |
| DTL | MRP1_TYPE | STRING | 41 | 1/4 | |
| DTL | MRP2_TYPE | STRING | 42 | 1/4 | |
| DTL | MSG_RATE_CLASS | STRING | 43 | 1/2 | |
| DTL | NC_CODE | STRING | 44 | 1/4 | |
| DTL | NCI_CODE | STRING | 45 | 1/12 | |
| DTL | NPA_NXX | STRING | 46 | 3/6 | |
| DTL | ORIG_ADDR | STRING | 47 | 1/90 | |
| DTL | ORIG_CITY | STRING | 48 | 1/35 | |
| DTL | ORIG_COUNTRY | STRING | 49 | 1/35 | |
| DTL | ORIG_COUNTRY_CODE | STRING | 50 | 3/4 | |
| DTL | ORIG_STATE | STRING | 51 | 2/2 | |
| DTL | ORIG_TN | STRING | 52 | 1/24 | |
| DTL | PIC | STRING | 53 | 1/10 | |
| DTL | PIU | STRING | 54 | 3/3 | |
| DTL | PLU | STRING | 55 | 3/3 | |
| DTL | PON | STRING | 56 | 1/30 | |
| DTL | PPU | STRING | 57 | 3/3 | |
| DTL | PREMIUM_IND | STRING | 58 | 1/1 | |
| DTL | PRICE_FLEX_IND | STRING | 59 | 1/1 | |
| DTL | QTY1 | FLOAT | 60 | 1/15 | |
| DTL | QTY2 | INTEGER | 61 | 15 | |
| DTL | RATCHET_FACTOR | FLOAT | 62 | 1/8 | |
| DTL | RATE_PERIOD_IND | STRING | 63 | 1/2 1/2 | |
| DTL | RATE_ZONE_IND | STRING | 64 | 1/1 | |
| DTL | SON | STRING | 65 | 1/30 | |
| DTL | ST_LVL_CO_CODE | STRING | 66 | 4/4 | |
| DTL | STATE | STRING | 67 | 2/2 | |
| DTL | SUMMARY_USAGE_IND | STRING | 68 | 1/1 | |
| DTL | TANDEM_ID | STRING | 69 | 1/11 | |
| DTL | TERM_ADDR | STRING | 70 | 1/90 | |
| DTL | TERM_CITY | STRING | 71 | 1/35 | |
| DTL | TERM_COUNTRY | STRING | 72 | 1/35 | |
| DTL | TERM_COUNTRY_CODE | STRING | 73 | 3/4 | |
| DTL | TERM_END_DATE | DATE | 74 | 8/8 | |
| DTL | TERM_LENGTH | INTEGER | 75 | 1/3 | |
| DTL | TERM_PLAN_ID | STRING | 76 | 1/35 | |
| DTL | TERM_START_DATE | DATE | 77 | 8/8 | |
| DTL | TERM_STATE | STRING | 78 | 2/2 | |
| DTL | TERM_TN | STRING | 79 | 1/24 | |
| DTL | TN | STRING | 80 | 1/24 | |
| DTL | UNIT_RATE | FLOAT | 81 | 1/17 | |
| DTL | UNIT | STRING | 82 | 1/2 | |
| DTL | ORIG_IP_ADDRESS | STRING | 83 | 8/15 | |
| DTL | TERM_IP_ADDRESS | STRING | 84 | 8/15 | |
| DTL | FTR_GRP | STRING | 85 | 1/1 | |
| DTL | CKT_CLASS_CODE | STRING | 86 | 1/10 | |
| DTL | CKT_CLASS_CODE_TYPE | STRING | 87 | 1/1 | |
| DTL | FRAC_MOU_IND | STRING | 88 | 1/1 | |
| DTL | ORIG_CITY_CODE | STRING | 89 | 1/6 | |
| DTL | TERM_CITY_CODE | STRING | 90 | 1/6 | |
| DTL | TRANS_RATE_ELE_IND | STRING | 91 | 1/2 | |
| DTL | VERT_FTR_IND | STRING | 92 | 1 | |
| DTL | SEC_NCI_CODE | STRING | 93 | 1/12 | |
| DTL | ACCESS_SVC_GRP | STRING | 94 | 1/11 | |
| DTL | TRANS_AMT | FLOAT | 95 | 1/11 | |
| DTL | ACCESS_AMT | FLOAT | 96 | 1/11 | |
| END - Detail Record (1 Occurrence per Invoice) | | | | | |
| END | RECORD_TYPE | STRING | 1 | 3/3 | Y |
| END | DTL_RECORD_COUNT | INTEGER | 6 | 1/6 | Y |

| DTL Record Sort Order |
|---|
| From Development, the XIF shall be sorted using the following order to maximize performance: |
| ACCT_NUM |
| INV_CO_CODE |
| INV_NUM |
| BILL_DATE |
| CHRG_TYPE |
| USAGE_SUMMARY_IND |
| PON |
| SON |
| TANDEM_ID |

| DTL Record Sort Order |
|---|
| From Development, the XIF shall be sorted using the following order to maximize performance: |
| END_OFC_ID |
| EC_CIRCUIT_ID |
| TN |

| TLR - Detail Record (1 Occurrence per file) | | | | | | |
|---|---|---|---|---|---|---|
| Record | Field Name | Data Type | Position | Min/Max | Required | Definition |
| TLR | RECORD_TYPE | STRING | 1 | 3/3 | Y | |
| TLR | INV_COUNT | INTEGER | 6 | 1/6 | Y | |

| 1. Req. # | 2. Source Record | 3. Source Field | XIF Mapping | | |
|---|---|---|---|---|---|
| | | | 4. Destination Table.Field | 5. Population Rules | 6. Message |
| | SUM | ACCT_NUM INV_CO_CODE | BL.ban_id | DataLoader shall create a record in BAN_LIST generating a unique ban_id for each unique SUM.ACCT_NUM (compare against BL.ban) and SUM.INV_CO_CODE (BL.originating_company_code) combination not already found in BAN_LIST. If BAN is found in BL, DataLoader shall use the existing BL.ban_id. | N/A |
| | SUM | ACCT_NUM | BL.ban | DataLoader shall insert SUM.acct_num into BL.ban. | N/A |
| | SUM | INV_CO_CODE | BL.originating_company_code | DataLoader shall insert SUM.inv_co_code into BL.originating_company_code. | N/A |
| | SUM | BILL_DATE | BL.bill_period | DataLoader shall extract the day (DD) value from SUM.bill_date and insert value into BL.bill_period. The XIF date format is MM-DD-YYYY. | N/A |
| | SUM | ACCT_TYPE | BL.account_type | DataLoader shall insert SUM.account_type into BL.account_type unless the SUM.acct_type is null. If the SUM.acct_type is null then DataLoader shall set BL.account_type = 'M'. | N/A |
| | SUM | ICSC_CODE | BL.icsc | If SUM.icsc_code is not null, then DataLoader shall insert SUM.icsc_code in BL.icsc. If SUM.icsc_code is null, then DataLoader shall leave BL.icsc null. | N/A |
| | SUM | INV_MPB_IND | BL.mpb_ind | If SUM.inv_mpb_ind is not null, then DataLoader shall insert SUM.inv_mpb_ind in BL.mpb_ind. If SUM.inv_mpb_ind is null, then DataLoader shall leave BL.mpb_ind null. | N/A |
| | | | BL.ban_status | DataLoader shall set BL.ban_status = 'NEW'. | N/A |

XIF Mapping -continued

| 1. Req. # | 2. Source Record | 3. Source Field | 4. Destination Table.Field | 5. Population Rules | 6. Message |
|---|---|---|---|---|---|
| | | | BL.createdby | DataLoader shall set BL.createdby with the system ID. | N/A |
| | | | BL.datecreated | DataLoader shall set BL.datecreated with system date. | N/A |
| | | | BL.dispute_ban_id | DataLoader shall set BL.dispute_ban_id = BL.ban_id. | N/A |
| | SUM | ACCT_NUM INV_CO_CODE INV_NUM BILL_DATE | I.invoice_seq_id | Dataloader shall create a record in INVOICE generating a unique invoice_seq_id for the unique combination of SUM.acct_num, SUM.inv_co_code (DataLoader shall use the SUM.acct_num and SUM.inv_co_code to retrieve the BL.ban_id), SUM.inv_num, and SUM.bill_date combination. If the ban_id, SUM.inv_num, and SUM.bill_date combination already exists in INVOICE then a fatal error will occur and DataLoader will fail the file. | Use Standard Duplicate Invoice Fatal Message and fail file. |
| | | | I.master_invoice_seq_id | DataLoader shall set I.master_invoice_seq_id = I.invoice_seq_id. | N/A |
| | SUM | MASTER_ACCT_NUM ACCT_NUM | I.assn_type | If SUM.master_acct_num is null, then DataLoader shall set I.assn_type = '0'. If SUM.master_acct_num is not null and SUM.master_acct_num = SUM.acct_num, then DataLoader shall set I.assn_type = '1'. If SUM.master_acct_num is not null and SUM.master_acct_num does not equal SUM.acct_num, then DataLoader shall set I.assn_type = '2'. | N/A |
| | SUM | ACCT_NUM INV_CO_CODE | I.ban_id | DataLoader shall insert the corresponding BL.ban_id into I.ban_id using the SUM.acct_num and SUM.inv_co_code for reference. | N/A |
| | SUM | INV_NUM | I.invoice | DataLoader shall insert SUM.inv_num into I.invoice. | N/A |

-continued

XIF Mapping

| 1. Req. # | 2. Source Record | 3. Source Field | 4. Destination Table.Field | 5. Population Rules | 6. Message |
|---|---|---|---|---|---|
| | SUM | BILL_DATE | I.bill_date | DataLoader shall insert SUM.bill_date into I.bill_date. | N/A |
| | SUM | SOURCE_TYPE | I.inv_format | DataLoader shall set concatenate value = 'XIF-' to the SUM.source_type and insert the value into I.inv_format. | N/A |
| | HDR | VERSION | I.version | DataLoader shall insert HDR.version into I.version. | DataLoader should use Code = 235/ Name = FORMAT_VERSION_NOT_SUPPORTED if the version is no longer supported. |
| | SUM | BAL_FORWARD_AMT | I.balance_fwd | DataLoader shall insert SUM.bal_forward_amt into I.balance_fwd. | N/A |
| | SUM | TOT_ADJ_AMT | I.adjustments | DataLoader shall insert SUM.tot_adj_amt into I.adjustments. | N/A |
| | SUM | TOT_PAYMENT_AMT | I.payments | DataLoader shall insert SUM.tot_payment_amt into I.payments. | N/A |
| | SUM | CURRENT_DUE_AMT | I.current_due | DataLoader shall insert SUM.current_due_amt into I.current_due. | N/A |
| | SUM | TOT_LAST_AMT | I.total_last | DataLoader shall insert SUM.tot_last_amt into I.total_last. | N/A |
| | SUM | TOT_DUE_AMT | I.total_due | DataLoader shall insert SUM.tot_due_amt into I.total_due. | N/A |
| | SUM | TOT_USG_AMT | I.usage_amt | DataLoader shall insert SUM.tot_usg_amt into I.usage_amt. | N/A |
| | SUM | TOT_OCC_AMT | I.occ_total_amt | DataLoader shall insert SUM.tot_occ_amt into I.occ_total_amt. | N/A |
| | SUM | TOT_TAX_AMT | I.taxes | DataLoader shall insert SUM.tot_tax_amt into INVOICE.taxes. | N/A |
| | SUM | TOT_LPC_AMT | I.late_charge | DataLoader shall insert SUM.tot_lpc_amt into I.late_charge. | N/A |

-continued

XIF Mapping

| 1. Req. # | 2. Source Record | 3. Source Field | 4. Destination Table.Field | 5. Population Rules | 6. Message |
|---|---|---|---|---|---|
| | SUM | TOT_MRC_AMT | I.monthly_charge | DataLoader shall insert SUM.tot_mrc_amt into I.monthly_charge. | N/A |
| | SUM | TOT_REG_FEE_AMT | I.regulatory_fees | DataLoader shall insert SUM.tot_reg_fee_amt into I.regulatory_fees. | N/A |
| | SUM | TOT_REJECT_AMT | I.bank_reject_amt | DataLoader shall insert SUM.tot_reject_amt into I.bank_reject_amt. | N/A |
| | SUM | TOT_SURCHRG_AMT | I.surcharges | DataLoader shall insert SUM.tot_surchrg_amt into I.surcharges. | N/A |
| | SUM | MIN_DUE | I.min_due | DataLoader shall insert SUM.min_due into I.min_due. | N/A |
| | SUM | INV_FROM_DATE | I.monthly_charge_from_date | DataLoader shall insert SUM.inv_from_date into I.monthly_charge_from_date. | N/A |
| | SUM | INV_THRU_DATE | I.monthly_charge_thru_date | DataLoader shall insert SUM.inv_thru_date into I.monthly_charge_thru_date. | N/A |
| | SUM | TRANSMIT_DATE | I.transmit_date | DataLoader shall insert SUM.transmit_date into I.transmit_date. | N/A |
| | SUM | DUE_DATE | I.due_date | DataLoader shall insert SUM.due_date into I.due_date. | N/A |
| | SUM | | I.logged_date | DataLoader shall insert the date of the batch is processed into I.logged_date. | N/A |
| | SUM | | I.createdby | Populate I.CreatedBy with the Users.User_ID associated with the Users.Name that appears in VVREF.Descrip for the VVREF.VV_Obj_Name = 'WORKASSIGNMENT' and VVREF.VV_Code = 'XIF'. If a match is not found in the Users table then populate I.Createdby with '1' (indicating System as the user). | |
| | DTL | CHRG_TYPE | LD.lpc_dtl_seq_id LD.invoice_seq_id | Dataloader shall create a record in LPC_DETAIL generating a unique lpc_dtl_seq_id for each record where DTL.chrg_type = 'LPC' and CHRG_BILLED_AMT is not null or equal to zero. DataLoader shall insert the | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | CHRG_FROM_DATE | LD.lpc_from_date | corresponding I.invoice_seq_id into LD.invoice_seq_id If not null, DataLoader shall insert DTL.chrg_from_date into LD.lpc_from_date. | N/A |
| | DTL | CHRG_THRU_DATE | LD.lpc_thru_date | If not null, DataLoader shall insert DTL.chrg_thru_date into LD.lpc_thru_date. | N/A |
| | DTL | CHRG_BILLED_AMT | LD.lpc_total | DataLoader shall insert DTL.chrg_billed_amt into LD.lpc_total. | N/A |
| | DTL | JURISDICTION | LD.lpc_jur_ind | If not null, DataLoader shall insert DTL.jurisdiction into LD.lpc_jur_ind. If DTL.jurisdiction is null LD.jur_ind = '0'. | N/A |
| | DTL | CHRG_DESC | LD.descrip | If not null, DataLoader shall insert DTL.CHRG_DESC into LD.descrip. | N/A |
| | DTL | | LD.occ_adj_ind | DataLoader shall set the LD.occ_adj_ind = "O". | N/A |
| | DTL | EC_CIRCUIT_ID | LD.ec_circuit_id | If not null, DataLoader shall insert DTL.ec_circuit_id into LD.ec_circuit_id. | N/A |
| | | | LD.strip_ec_circuit_id | DataLoader shall remove all spaces, periods, slashes, commas, and dashes from LD.ec_circuit_id and insert converted value into LD.strip_ec_circuit_id. | N/A |
| | DTL | STATE | LD.state_code | If not null, DataLoader shall insert DTL.state into LD.state_code. | N/A |
| | DTL | PIU | LD.lpc_piu | If not null and not greater than 100, DataLoader shall insert DTL.PIU into LD.PIU otherwise leave null | N/A |
| | DTL | PLU | LD.lpc_plu | If not null and not greater than 100, DataLoader shall insert DTL.PLU into LD.LPC_PLU otherwise leave null. | N/A |
| | DTL | DAYS_LATE | LD.lpc_num_days | If not null, DataLoader shall insert DTL.days_late into LD.lpc_num_days | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | CHRG_BASE_AMT | LD.lpc_base_amt | If not null, DataLoader shall insert DTL.chrg_base_amt into LD.lpc_base_amt. | N/A |
| | DTL | CHRG_BASE_AMT<br>CHRG_BILLED_AMT | LD.amt_excluded_from_lpc | If DTL.CHRG_BASE_AMT is not null, then DataLoader shall calculate LD.amt_excluded_from_lpc using the following formula: (CHRG_BILLED_AMT − CHRG_BASE_AMT) = LD.amt_excluded_from_lpc. | N/A |
| | DTL | AUDIT_NUM | LD.audit_num | If not null, DataLoader shall insert DTL.audit_num into LD.audit_num. If value exceeds Databases constraints truncate value. | N/A |
| | DTL | CHRG_TYPE<br>PON<br>SON<br>CHRG_BILLED_AMT | OCC_TOTAL.occ_total_id<br>OCC_TOTAL.invoice_seq_id | Dataloader shall consider a record eligible for insertion into OCC_TOTAL where DTL.chrg_type = 'FRC' or 'NRC'; DTL.chrg_billed_amt is not null or equal to zero, and DTL.pon or DTL.son is not null. DataLoader shall generate a unique OCC_TOTAL.occ_total_id for eligible records using the DTL.son and DTL.pon combination to indicate a group. DataLoader shall insert the corresponding I.invoice_seq_id into OCC_TOTAL.invoice_seq_id. | N/A |
| | DTL | CHRG_BILLED_AMT | OCC_TOTAL.occ_billed_amt | DataLoader shall provide a sum of the DTL.chrg_billed_amt for the group and insert the value into OCC_TOTAL.occ_billed_amt. | N/A |
| | DTL | COMPLETION_DATE | OCC_TOTAL.completion_date | DataLoader shall insert DTL.completion_date into OCC_TOTAL.completion_date from the first record in the group. | N/A |
| | DTL | PON | OCC_TOTAL.purchase_order_num | If not null, DataLoader shall insert DTL.pon into OCC_TOTAL.purchase_order_num. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | SON | OCC_TOTAL.service_order_num | If not null, DataLoader shall insert DTL.son into OCC_TOTAL.service_order_num. | N/A |
| | DTL | ST_LVL_CO_CODE | OCC_TOTAL.state_level_company_code | If not null, DataLoader shall insert DTL.st_lvl_co_code into OCC_TOTAL.state_level_company_code from the first record in the group. | N/A |
| | DTL | STATE | OCC_TOTAL.state_code | If not null, DataLoader shall insert DTL.state into OCC_TOTAL.state_code from the first record in the group. | N/A |
| | DTL | CHRG_TYPE CHRG_BILLED_AMT | OCC_TOTAL.occ_fractional_amt | Where DTL.chrg_typ = 'FRC', DataLoader shall sum DTL.chrg_billed_amt for the group and insert into OCC_TOTAL.occ_fractional_amt. | N/A |
| | DTL | CHRG_TYPE CHRG_BILLED_AMT | OCC_TOTAL.occ_one_time_amt | Where DTL.chrg_typ = 'NRC', DataLoader shall sum DTL.chrg_billed_amt for the group and insert into OCC_TOTAL.occ_one_time_amt. | N/A |
| | DTL | CHRG_TYPE CHRG_BILLED_AMT | OAD.occ_adj_dtl_id OAD.invoice_seq_id | Dataloader shall create a record in OCC_ADJ_DTL generating a unique occ_adj_dtl_id for each record where the DTL.chrg_type = 'FRC', 'NRC', or 'ADJ' and DTL.chrg_billed_amt is not null or equal to zero. If DTL.chrg_billed_amt is null or is equal to zero, then no record will be generated in the OAD table or subordinate structures (PDD, OACD, and JD) regardless of other conditions. DataLoader shall insert the corresponding l.invoice_seq_id into OAD.invoice_seq_id. | N/A |
| | DTL | CHRG_TYPE | OAD.occ_total_id | If DTL.chrg_type = 'FRC' or 'NRC', DataLoader shall insert the corresponding OCC_TOTAL.occ_total_id into OAD.occ_total_id if record meets criteria of OCC_TOTAL otherwise leave null. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | CHRG_TYPE | OAD.occ_adj_ind | If DTL.chrg_type = 'ADJ', DataLoader shall leave OAD.occ_total_id null. DataLoader shall set OAD.occ_adj_ind = 'A' when DTL.chrg_type = 'ADJ'. DataLoader shall set OAD.occ_adj_ind = 'O' when DTL.chrg_type = 'FRC' or 'NRC'. | N/A |
| | DTL | CHRG_FROM_DATE | OAD.from_date | If not null, DataLoader shall insert DTL.chrg_from_date into OAD.from_date. | N/A |
| | DTL | CHRG_THRU_DATE | OAD.thru_date | If not null, DataLoader shall insert DTL.chrg_thru_date into OAD.thru_date. | N/A |
| | DTL | CHRG_BILLED_AMT | OAD.amt_total | DataLoader shall insert DTL.chrg_billed_amt into OAD.amt_total. | N/A |
| | DTL | QTY2 | OAD.qty | DataLoader shall insert DTL.qty2 into OAD.qty. | N/A |
| | DTL | UNIT | OAD.unit | DataLoader shall insert DTL.unit into OAD.unit. | N/A |
| | DTL | CHRG_TYPE | OAD.bal_due_current_chg_ind | DataLoader shall set OAD.bal_due_current_chg_ind = '0' when DTL.chrg_type = 'ADJ'. DataLoader shall set OAD.bal_due_current_chg_ind = '1' when DTL.chrg_type = 'FRC' or 'NRC'. | N/A |
| | DTL | CHRG_CODE | OAD.line_item_code | If not null, DataLoader shall insert DTL.chrg_code into OAD.line_item_code. If null, DataLoader shall set OAD.line_item_code = 'UNKNOWN'. | N/A |
| | DTL | CHRG_DESC | OAD.line_item_code_desc | DataLoader shall insert DTL.chrg_desc into OAD.line_item_code_desc. | N/A |
| | DTL | CHRG_CODE_TYPE | OAD.code_type_ind | If not null, DataLoader shall insert DTL.chrg_code_type into OAD.code_type_ind. If null and CHRG_TYPE = 'FRC' then DataLoader shall set OAD.code_type_ind = '30'. If null and CHRG_TYPE = 'NRC' or 'ADJ', then DataLoader shall set OAD.code_type_ind = '29' | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | INV_NUM | OAD.apply_inv | DataLoader shall insert DTL.inv_num into OAD.apply_inv. | N/A |
| | DTL | CHRG_TYPE CHRG_FROM_DATE | OAD.adj_date | DataLoader shall insert DTL.chrg_from_date into OAD.adj_date when DTL.chrg_type = 'ADJ'. DataLoader shall leave OAD.adj_date NULL when DTL.chrg_type = 'FRC' or 'NRC. | N/A |
| | DTL | CHRG_TYPE | OAD.recurring_chg_ind | If DTL.chrg_type = 'FRC' then DataLoader shall set the OAD_recurring_chg_ind = '1'. If DTL.chrg_type = 'NRC' then DataLoader shall set the OAD.recurring_chg_ind = '2'. If DTL.chrg_type = 'ADJ' then DataLoader shall set the OAD.recurring_chg_ind = '0'. | N/A |
| | DTL | PIU | OAD.piu | If not null and not greater than 100, DataLoader shall insert DTL.piu into OAD.piu otherwise leave null. | N/A |
| | DTL | BIP | OAD.bip | If not null and not greater than 100, DataLoader shall insert DTL.bip into OAD.bip otherwise leave null. | N/A |
| | DTL | LATA | OAD.lata | If not null, DataLoader shall insert DTL.lata into OAD.lata. | N/A |
| | DTL | STATE | OAD.st_code | If not null, DataLoader shall insert DTL.state into OAD.st_code. | N/A |
| | DTL | ST_LVL_CO_CODE | OAD.st_lvl_co_code | If not null, DataLoader shall insert DTL.st_lvl_co_code into OAD.st_lvl_co_code. | N/A |
| | DTL | UNIT_RATE | OAD.rate | If not null, DataLoader shall insert DTL.unit_rate into OAD.rate. If value exceeds the whole number (left of decimal), then DataLoader shall skip insert. | N/A |
| | DTL | AUDIT_NUM | OAD.audit_num | If not null, DataLoader shall insert DTL.audit_num into OAD.audit_num. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | TERM_PLAN_ID<br>TERM_START_DATE<br>TERM_END_DATE<br>TERM_LENGTH<br>CHRG_BASE_AMT<br>CHRG_DISC_AMT | PDD.plan_disc_dtl_id<br>PDD.occ_adj_dtl_id | Dataloader shall create a record in PLAN_DISC_DTL generating a unique plan_disc_dtl_id for each record where the DTL.chrg_type = 'FRC', 'NRC', or 'ADJ' and one or more of the following fields is populated for the record:<br>DTL.term_plan_id<br>DTL.term_start_date<br>DTL.term_end_date<br>DTL.term_length<br>DTL.chrg_base_amt<br>DTL.chrg_disc_amt<br>DataLoader shall insert the corresponding OAD.occ_adj_dtl_id into PDD.occ_adj_dtl_id. | N/A |
| | DTL | TERM_PLAN_ID | PDD.plan_id | If not null, DataLoader shall insert DTL.term_plan_id into PDD.plan_id. | N/A |
| | DTL | TERM_START_DATE | PDD.term_agree_start_date | If not null, DataLoader shall insert DTL.term_start_date into PDD.term_agree_start_date | N/A |
| | DTL | TERM_END_DATE | PDD.term_agree_end_date | If not null, DataLoader shall insert DTL.term_end_date into PDD.term_agree_end_date. | N/A |
| | DTL | TERM_LENGTH<br>TERM_START_DATE<br>TERM_END_DATE | PDD.length_of_term | If not null, DataLoader shall insert DTL.term_length into PDD.length_of_term.<br>If null and DTL.term_start_date AND DTL.term_end_date are populated, then DataLoader shall calculate the number of months between the DTL.term_start_date and DTL.term_end_date and insert the calculated value into PDD.length_of_term. | |
| | DTL | CHRG_BASE_AMT<br>CHRG_DISC_AMT<br>CHRG_BILLED_AMT | PDD.base_amt | If not null, DataLoader shall insert DTL.chrg_base_amt into PDD.base_amt.<br>If null and DTL.chrg_disc_amt is not null, then DataLoader shall | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | CHRG_DISC_AMT CHRG_BASE_AMT CHRG_BILLED_AMT | PDD.disc_amt | calculate the PDD.base_amt using the following formula: (DTL.chrg_billed_amt + DTL.chrg_disc_amt) = PDD.base_amt If not null, DataLoader shall insert DTL.chrg_disc_amt into PDD.disc_amt. If null and DTL.chrg_base_amt is not null, then DataLoader shall calculate the PDD.disc_amt using the following formula: (DTL.chrg_base_amt − DTL.chrg_billed_amt) = PDD.disc_amt | N/A |
| | | | PDD.disc_pct | If the PDD.base_amt is not null, DataLoader shall calculate the PDD.disc_pct using the following calculation: (PDD.disc_amt/PDD.base_amt) = PDD.disc_pct | N/A |
| | | | JD.jur_dtl_id JD.occ_adj_dtl_id | Dataloader shall create a record in JUR_DTL with a unique jur_dtl_id for each OCC_ADJ_DTL record generated in the invoice load. Upon creation of the JUR_DTL record, DataLoader shall insert the corresponding OAD.occ_adj_dtl_id into JD.occ_adj_dtl_id creating a 1:1 relationship between OCC_ADJ_DTL and JUR_DTL. | N/A |
| | DTL | JURISDICTION | JD.jur_ind | If not null, Data Loader shall insert DTL.jurisiction into JD.jur_ind. If DTL.jurisdiction is null, DataLoader shall set JD.jur_ind = '0'. | N/A |
| | DTL | CHRG_BILLED_AMT | JD.amt | DataLoader shall insert DTL.chrg_billed_amt into JD.amt. | N/A |
| | DTL | RATE_ZONE_IND | JD.rate_zone_ind | DataLoader shall insert DTL.rate_zone_ind into JD.rate_zone_ind. | N/A |
| | DTL | CHRG_TYPETN EC_CIRCUIT_ID IC_CIRCUIT_ID END_OFC_ID | OACD.occ_adj_circuit_dtl_id OACD.occ_adj_dtl_id | Dataloader shall create a record in OCC_ADJ_CIRCUIT_DTL with a unique occ_adj_circuit_dtl_id for each OCC_ADJ_DTL record where the DTL.chrg_type = 'FRC', or | N/A |

-continued

XIF Mapping

| 1. Req. # | 2. Source Record | 3. Source Field | 4. Destination Table.Field | 5. Population Rules | 6. Message |
|---|---|---|---|---|---|
| | | | | 'NRC' and one or more of the following fields is populated for the record: DTL.end_ofc_id DTL.ec_circuit_id DTL.ic_circuit_id DTL.tn DataLoader shall insert the corresponding OAD.occ_adj_dtl_id into OACD.occ_adj_dtl_id. | |
| | DTL | EC_CIRCUIT_ID | OACD.circuit_heading | If DTL.ec_circuit_id is not null, DataLoader shall insert DTL.ec_circuit_id into OACD.circuit_heading and set OACD.circuit_heading_ind = 'CLS'. If DTL.ec_circuit_id is null and DTL.tn is not null, DataLoader shall insert DTL.tn into OACD.circuit_heading and set OACD.circuit_heading_ind = 'TN'. Otherwise leave null. | N/A |
| | | TN | OACD.circuit_heading_ind | | |
| | | | OACD.strip_circuit_heading | DataLoader shall remove all spaces, periods, slashes, commas, and dashes from OACD.circuit_heading and insert converted value into OACD.strip_circuit_heading. | N/A |
| | DTL | RATCHET_FACTOR | OACD.ratchet_factor | If not null, DataLoader shall insert DTL.ratchet_factor into OACD.ratchet_factor. | N/A |
| | DTL | MRP1 | OACD.mrp1 | If not null, DataLoader shall insert DTL.mrp1 into OACD.mrp1. | N/A |
| | DTL | MRP2 | OACD.mrp2 | If not null, DataLoader shall insert DTL.mrp2 into OACD.mrp2. | N/A |
| | DTL | MRP1_TYPE | OACD.mrp1_type | If not null, DataLoader shall insert DTL.mrp1_type into OACD.mrp1_type. | N/A |
| | DTL | MRP2_TYPE | OACD.mrp2_type | If not null, DataLoader shall insert DTL.mrp2_type into OACD.mrp2_type. | N/A |
| | DTL | STATE | OACD.rate_state | If not null, DataLoader shall insert DTL.state into OACD.rate_state. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | IC_CIRCUIT_ID | OACD.ic_circuit_id | If not null, DataLoader shall insert DTL.ic_circuit_id into OACD.ic_circuit_id. | N/A |
| | DTL | END_OFC_ID<br>TANDEM_ID | OACD.group_heading | If not null, DataLoader shall insert DTL.end_ofc_id into OACD.group_heading and set OACD.group_heading_ind = 'OCL'. If DTL.end_ofc_id is null and DTL.tandem_id is not null, DataLoader shall insert DTL.tandem_id into OACD.group_heading and set OACD.group_heading_ind = 'OCL'. Otherwise leave OACD.group_heading and OACD.group_heading_ind null. | N/A |
| | DTL | CHRG_FED_TAX_AMT<br>CHRG_ST_LCL_TAX_AMT<br>CHRG_REG_FEE_AMT<br>CHRG_SURCHRG_AMT<br>CHRG_TYPE<br>CHRG_BILLED_AMT | TSD.ts_detail_id<br>TSD.invoice_seq_id | DataLoader shall create a record in TAX_SURCHARGE_DETAIL generating a unique ts_detail_id only if the record meets the following rules<br>DTL.chrg_type != 'TAX' and DTL.chrg_fed_tax_amt is not null or equal to zero.<br>Or<br>DTL.chrg_type != 'TAX' and DTL.chrg_st_lcl_tax_amt is not null or equal to zero.<br>Or<br>DTL.chrg_type != 'TAX' and DTL.chrg_reg_fee_amt is not null or equal to zero.<br>Or<br>DTL.chrg_type != 'TAX' and DTL.chrg_surchrg_amt is not null or equal to zero.<br>Or<br>DTL.chrg_type = 'TAX' and DTL.chrg_billed_amt is not null or equal to zero.<br>If record has meets more than one of the above conditions DataLoader shall generate a unique record for each passed condition. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | CHRG_FED_TAX_AMT<br>CHRG_ST_LCL_TAX_AMT<br>CHRG_REG_FEE_AMT<br>CHRG_SURCHRG_AMT<br>CHRG_TYPE<br>CHRG_CODE_TYPE | TSD.ts_rec_type | Generate TAX_SURCHARGE_DETAIL record and insert the corresponding L.invoice_seq_id into TSD.invoice_seq_id.<br>If record was generated by DTL.chrg_fed_tax_amt or DTL.chrg_st_lcl_tax_amt, DataLoader shall set TSD.ts_rec_type = 'TAX'.<br>If record was generated by DTL.chrg_reg_fee_amt, DataLoader shall set TSD.ts_rec_type = 'REGULATORY'.<br>If record was generated by DTL.chrg_surchrg_amt, DataLoader shall set TSD.ts_rec_type = 'SURCHARGE'.<br>If record was generated by DTL.chrg_type = 'TAX' and DTL.chrg_code_type is not null then, DataLoader shall insert the DTL.chrg_code_type into TSD.ts_rec_type, otherwise leave null. | N/A |
| | DTL | CHRG_TYPE | TSD.occ_adj_ind | If DTL.chrg_type = 'FRC' or 'NRC', DataLoader shall set TSD.occ_adj_ind = 'O' (O—Omega.)<br>If DTL.chrg_type = 'ADJ', DataLoader shall set TSD.occ_adj_ind = 'A'.<br>Otherwise leave null. | N/A |
| | DTL | CHRG_FED_TAX_AMT<br>CHRG_ST_LCL_TAX_AMT<br>CHRG_REG_FEE_AMT<br>CHRG_SURCHRG_AMT<br>CHRG_TYPE<br>CHRG_CODE | TSD.ts_type_ind | If record was generated by DTL.chrg_fed_tax_amt, DataLoader shall set TSD.ts_type_ind = '1'.<br>If record was generated by DTL.chrg_st_lcl_tax_amt, DataLoader shall set TSD.ts_type_ind = '2'.<br>If record was generated by DTL.chrg_reg_fee_amt, DataLoader shall set TSD.ts_type_ind = '19'.<br>If record was generated by DTL.chrg_surchrg_amt, | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | CHRG_FED_TAX_AMT CHRG_ST_LCL_TAX_AMT CHRG_REG_FEE_AMT CHRG_SURCHRG_AMT CHRG_TYPE CHRG_BILLED_AMT | TSD.ts_type_total | DataLoader shall set TSD.ts_type_ind = '27'. If record was generated by DTL.chrg_type = 'TAX' and DTL.chrg_code is not null then, DataLoader shall insert the DTL.chrg_code into TSD.ts_type_ind, otherwise leave null. If record was generated by DTL.chrg_fed_tax_amt, DataLoader shall insert DTL.chrg_fed_tax_amt into TSD.ts_type_total. If record was generated by DTL.chrg_st_lcl_tax_amt, DataLoader shall insert DTL.chrg_st_lcl_tax_amt into TSD.ts_type_total. If record was generated by DTL.chrg_reg_fee_amt, DataLoader shall insert DTL.chrg_reg_fee_amt into TSD.ts_type_total. If record was generated by DTL.chrg_surchrg_amt, DataLoader shall insert DTL.chrg_surchrg_amt into TSD.ts_type_total. If record was generated by DTL.chrg_type = 'TAX' then DataLoader shall insert the DTL.chrg_billed_amt into TSD.ts_type_total. | N/A |
| | DTL | JURISDICTION | TSD.jur_ind | If not null, DataLoader shall insert DTL.jurisiction int TSD.jur_ind. If DTL.jurisdiction is null TSD.jur_ind = '0'. | N/A |
| | DTL | CHRG_CODE CHRG_DESC | TSD.remarks | DataLoader shall concatenate DTL.chrg_code and DTL.chrg_desc into TSD.remarks using a hyphen as a separator. | N/A |
| | DTL | CHRG_FROM_DATE | TSD.from_date | If not null, DataLoader shall insert DTL.chrg_from_date into TSD.from_date. | N/A |

XIF Mapping -continued

| 1. Req. # | 2. Source Record | 3. Source Field | 4. Destination Table.Field | 5. Population Rules | 6. Message |
|---|---|---|---|---|---|
| | DTL | CHRG_THRU_DATE | TSD.thru_date | If not null, DataLoader shall insert DTL.chrg_thru_date into TSD.thru_date. | N/A |
| | DTL | EC_CIRCUIT_ID TN | TSD.ec_circuit_id | If DTL.ec_circuit_id is not null, DataLoader shall insert DTL.ec_circuit_id into TSD.ec_circuit_id. If DTL.ec_circuit_id is null and DTL.tn is not null, DataLoader shall insert DTL.tn into TSD.ec_circuit_id. Otherwise leave null. | N/A |
| | | | TSD.strip_ec_circuit_id | DataLoader shall remove all spaces, periods, slashes, commas, and dashes from TSD.ec_circuit_id and insert converted value into TSD.strip_ec_circuit_id. | N/A |
| | DTL | CHRG_TYPE CHRG_BILLED_AMT | TSD.other_amt_subject_to_tax TSD.monthly_amt_subject_to_tax TSD.usage_amt_subject_to_tax | If the DTL.chrg_type = 'MRC', then DataLoader shall insert the DTL.chrg_billed_amt into TSD.monthly_amt_subject_to_tax. If the DTL.chrg_type = 'FRC', 'NRC', or 'ADJ', then DataLoader shall insert the DTL.chrg_billed_amt into TSD.other_amt_subject_to_tax. If the DTL.chrg_type = 'USG', then DataLoader shall insert the DTL.chrg_billed_amt into TSD.usage_amt_subject_to_tax. | N/A |
| | DTL | STATE | TSD.state_code | If not null, DataLoader shall insert DTL.state into TSD.state_code. | N/A |
| | DTL | ST_LVL_CO_CODE | TSD.state_level_company_code | If not null, DataLoader shall insert DTL.st_lvl_co_code into TSD.state_level_company_code. | N/A |
| | DTL | AUDIT_NUM | TSD.audit_num | If not null, DataLoader shall insert DTL.audit_num into TSD.audit_num. | N/A |
| | DTL | CHRG_TYPE CHRG_BILLED_AMT | VPR.vendor_payment_rec_id VPR.invoice_seq_id | DataLoader shall create a record in VENDOR_PAYMENT_RECEIVED generating a unique vendor_payment_rec_id only if DTL.chrg_type = 'PAY' and | N/A |

-continued

XIF Mapping

| 1. Req. # | 2. Source Record | 3. Source Field | 4. Destination Table.Field | 5. Population Rules | 6. Message |
|---|---|---|---|---|---|
| | | | | DTL.chrg_billed_amt is not null or equal to zero. DataLoader shall insert the corresponding I.invoice_seq_id into VPR.invoice_seq_id. | |
| | DTL | CHRG_CODE CHRG_DESC | VPR.payment_phrase | DataLoader shall concatenate DTL.chrg_code and DTL.chrg_desc into VPR.payment_phrase using a hyphen as a separator. | N/A |
| | DTL | CHRG_BILLED_AMT | VPR.received_amt | DataLoader shall insert DTL.chrg_billed_amt into VPR.received_amt. | N/A |
| | DTL | CHRG_FROM_DATE | VPR.payment_date | DataLoader shall insert DTL.chrg_from_date into VPR.payment_date. | N/A |
| | DTL | CHRG_TYPE ACCT_NUM INV_CO_CODE INV_NUM BILL_DATE | CA.csr_account_id CA.ban_id | If DTL.chrg_type = 'MRC' for any record in the invoice, then DataLoader shall create a record in CSR_ACCOUNT generating a unique csr_account_id for the invoice. This action will create a grouping of monthly recurring charge records. Dataloader will use the DTL.acct_num and DTL.inv_co_code to insert the corresponding ban_id from BL.ban_id into CA.ban_id. | |
| | DTL | INV_NUM | CA.invoice | DataLoader shall insert DTL.inv_num into CA.invoice. | N/A |
| | DTL | ACCT_NUM | CA.ban | DataLoader shall insert the value of DTL.acct_num into CA.ban from the grouping of records. | N/A |
| | DTL | BILL_DATE | CA.account_date | DataLoader shall insert DTL.bill_date into CA.account_date. | N/A |
| | | | CA.final_csr_ind | DataLoader shall set CA.final_csr_ind = '0'. | N/A |
| | HDR | VERSION | CA.version | DataLoader shall insert HDR.version into CA.version. | N/A |
| | SUM | ACCT_TYPE | CA.account_type | DataLoader shall insert SUM.acct_type into CA.account_type unless the | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | BILL_DATE | CA.bill_date | SUM.acct_type is null. If the SUM.acct_type is null then DataLoader shall use CA.ban_id to retrieve the BL.account_type from BAN_LIST. DataLoader shall insert BL.account_type into CA.account_type. DataLoader shall insert the DTL.bill_date into CA.bill_date. | N/A |
| | DTL | LATA | CA.lata_code | DataLoader shall insert the DTL.lata into CA.lata_code. | N/A |
| | DTL | CHRG_TYPE TANDEM_ID END_OFC_ID ACCESS_SVC_GRP | AO.asg_ocl_id AO.csr_account_id | DataLoader shall create a record in ASG_OCL with a unique asg_ocl_seq_id for each unique combination of AO.access_service_group and AO.ocl_location where DTL.chrg_type = 'MRC'. DataLoader shall insert the corresponding CA.csr_account_id into ASG_OCL.csr_account_id | N/A |
| | DTL | CKT_SRV_EST_DATE | AO.service_est_date | If not null, DataLoader shall insert DTL.ckt_srv_est_date into AO.service_est_date. | N/A |
| | DTL | END_OFC_ID TANDEM_ID | AO.ocl_location | If not null, DataLoader shall insert DTL.end_ofc_id into AO.ocl_location. If DTL.end_ofc_id is null and DTL.tandem_id is not null, DataLoader shall insert DTL.tandem_id into AO.ocl_location. | N/A |
| | DTL | CHRG_TYPE EC_CIRCUIT_ID TN | CCL.csr_circuit_listing_id CCL.csr_account_id | If the DTL.chrg_type = 'MRC', Dataloader shall create a unique record in CSR_CIRCUIT_LISTING generating a unique CCL.csr_circuit_listing_id for each unique DTL.ec_circuit_id or DTL.tn. DataLoader shall not generate a group where both DTL.ec_circuit_id and DTL.tn are null. | N/A |

-continued

XIF Mapping

| 1. Req. # | 2. Source Record | 3. Source Field | 4. Destination Table.Field | 5. Population Rules | 6. Message |
|---|---|---|---|---|---|
| | | | | DataLoader shall insert the corresponding CA.csr_account_id into CCL.csr_account_id. | |
| | DTL | END_OFC_ID TANDEM_ID | CCL.asg_ocl_seq_id | If DTL.end_ofc_id is not null, then DataLoader shall retrieve the ASG_OCL.asg_ocl_seq_id using the DTL.end_ofc_id for the CSR_ACCOUNT and insert into CCL.asg_ocl_seq_id. If DTL.end_ofc_id is null and DTL.tandem_id is not null, then DataLoader shall retrieve the ASG_OCL.asg_ocl_seq_id using the DTL.tandem_id for the CSR_ACCOUNT and insert into CCL.asg_ocl_seq_id. If both DTL.end_ofc_id and DTL.tandem_id are null then DataLoader shall leave CCL.asg_ocl_seq_id null. | N/A |
| | DTL | EC_CIRCUIT_ID TN | CCL.ec_circuit_id CCL.circuit_format_desc | If DTL.ec_circuit_id is not null, DataLoader shall insert DTL.ec_circuit_id into CCL.ec_circuit_id and set CCL.circuit_format_desc = 'CLS'. If DTL.ec_circuit_id is null and DTL.tn is not null, DataLoader shall insert DTL.tn into CCL.ec_circuit_id and set CCL.circuit_format_desc = 'TN'. | N/A |
| | | | CCL.strip_ec_circuit_id | DataLoader shall remove all spaces, periods, slashes, commas, and dashes from CCL.ec_circuit_id and insert converted value into CCL.strip_ec_circuit_id | N/A |
| | | | CCL.total_billed_amt | DataLoader shall sum LIID_amt related to the CCL record. | N/A |
| | DTL | CKT_SRV_EST_DATE | CCL.svc_est_date | DataLoader shall insert DTL.ckt_srv_est_date into CCL.svc_est_date from the first record in the group. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | PON | CCL.pon | If not null, DataLoader shall insert DTL.pon into CCL.pon from the first record in the group. | N/A |
| | DTL | SON | CCL.son | If not null, DataLoader shall insert DTL.son into CCL.son from the first record in the group. | N/A |
| | DTL | NC_CODE | CCL.nc_code | If not null, DataLoader shall insert DTL.nc_code into CCL.nc_code from the first record in the group. | N/A |
| | DTL | PIU | CCL.piu | If not null and not greater than 100, DataLoader shall insert DTL.piu into CCL.piu from the first record in the group. Otherwise leave null. | N/A |
| | DTL | CHRG_MPB_IND | CCL.mpb_ind | If not null, DataLoader shall insert DTL.chrg_mpb_ind into CCL.mpb_ind from the first record in the group. | N/A |
| | DTL | TERM_PLAN_ID | CCL.plan_id | If not null, DataLoader shall insert DTL.term_plan_id into CCL.plan_id from the first record in the group. | N/A |
| | DTL | TERM_START_DATE | CCL.term_agree_start_date | If not null, DataLoader shall insert DTL.term_start_date into CCL.term_agree_start_date from the first record in the group. | N/A |
| | DTL | TERM_END_DATE | CCL.term_agree_end_date | If not null, DataLoader shall insert DTL.term_end_date into CCL.term_agree_end_date from the first record in the group. | N/A |
| | DTL | TERM_LENGTH | CCL.length_of_term | If not null, DataLoader shall insert DTL.term_length into CCL.length_of_term from the first record in the group. If null and DTL.term_start_date AND DTL.term_end_date are populated, then DataLoader shall calculate the number of months between the DTL.term_start_date and DTL.term_end_date and insert the calculated value into CCL.length_of_term. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | MRP1 | CCL.mrp1 | If not null, DataLoader shall insert DTL.mrp1 into CCL.mrp1 from the first record in the group. | N/A |
| | DTL | MRP2 | CCL.mrp2 | If not null, DataLoader shall insert DTL.mrp2 into CCL.mrp2 from the first record in the group. | N/A |
| | DTL | MRP1_TYPE | CCL.mrp1_type | If not null, DataLoader shall insert DTL.mrp1_type into CCL.mrp1_type from the first record in the group. | N/A |
| | DTL | MRP2_TYPE | CCL.mrp2_type | If not null, DataLoader shall insert DTL.mrp2_type into CCL.mrp2_type from the first record in the group. | N/A |
| | DTL | CFA | CCL.cfa | If not null, DataLoader shall insert DTL.cfa into CCL.cfa from the first record in the group. | N/A |
| | DTL | CHRG_TYPE ORIG_ADDR ORIG_CITY ORIG_STATE TERM_ADDR TERM_CITY TERM_STATE NCI_CODE SEC_NCI_CODE | CL.circuit_loc_id CL.csr_circuit_listing_id | Then Dataloader shall create a record in CIRCUIT_LOC generating a unique circuit_loc_id where the following conditions are met for the CCL group:<br>DTL.chrg_type = 'MRC'<br>AND<br>DTL.orig_addr or<br>DTL.orig_city or<br>DTL.orig_state or<br>DTL.nci_code are not null.<br>-OR-<br>DTL.chrg_type = 'MRC'<br>AND<br>DTL.term_addr or<br>DTL.term_city or<br>DTL.term_state or<br>DTL.sec_nci_code are not null.<br>DataLoader shall insert the corresponding CCL.csr_circuit_listing_id into CL.csr_circuit_listing_id. | |

-continued

XIF Mapping

| 1. Req. # | 2. Source Record | 3. Source Field | 4. Destination Table.Field | 5. Population Rules | 6. Message |
|---|---|---|---|---|---|
| | | | | Note: If both conditions are met then DataLoader shall generate (2) CIRCUIT_LOC records for invoices coming from XTrak as this information is the same in all records for the circuit, but in the event that other vendors use XIF to import invoices into BTP, this may yield more combinations. | |
| | | | CL.circuit_loc | DataLoader shall increment the CL.circuit_loc by 1 starting with '1' for each record corresponding to the parent CCL.csr_circuit_listing_id. | N/A |
| DTL | ORIG_ADDR TERM_ADDR | | CL.circuit_loc_address | If record was generated by DTL.orig_addr or DTL.orig_city or DTL.orig_state, DataLoader shall insert DTL.orig_addr into CL.circuit_loc_address. If record was generated by DTL.term_addr or DTL.term_city or DTL.term_state, DataLoader shall insert DTL.term_addr into CL.circuit_loc_address. | N/A |
| DTL | CKT_SRV_EST_DATE | | CL.svc_est_date | If not null, DataLoader shall insert DTL.ckt_srv_est_date into CL.svc_est_date. | N/A |
| DTL | CUST_NAME | | CL.cust_name | If not null, DataLoader shall insert DTL.cust_name into CL.cust_name. | N/A |
| DTL | NCI_CODE | | CL.nci_code | If not null, DataLoader shall insert DTL.nci_code into CL.nci_code for the originating location record. | N/A |
| DTL | CFA | | CL.cfa | If not null, DataLoader shall insert DTL.cfa into CL.cfa. | N/A |
| DTL | LATA | | CL.lata | If not null, DataLoader shall insert DTL.lata into CL.lata. | N/A |
| DTL | ORIG_STATE TERM_STATE | | CL.rate_state | If record was generated by DTL.orig_addr or DTL.orig_city or DTL.orig_state, DataLoader shall insert DTL.orig_state into CL.rate_state. If record was generated by DTL.term_addr or DTL.term_city | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | ORIG_CITY TERM_CITY | CL.rate_city | or DTL.term_state, DataLoader shall insert DTL.term_state into CL.rate_state. If record was generated by DTL.orig_addr or DTL.orig_city or DTL.orig_state, DataLoader shall insert DTL.orig_city into CL.rate_city. If record was generated by DTL.term_addr or DTL.term_city or DTL.term_state, DataLoader shall insert DTL.term_city into CL.rate_city. | N/A |
| | DTL | CHRG_TYPE CHRG_BILLED_AMT | LI.line_item_id LI.circuit_loc_id | Dataloader shall create a record in LINE_ITEM generating a unique line_item_id for each record where the DTL.chrg_type = 'MRC' and the DTL.chrg_billed_amt is not NULL or not equal to zero. If a record was created for CIRCUIT_LOC, then DataLoader shall insert the corresponding CL.circuit_loc_id into LI.circuit_loc_id. Note: If both ORIG and TERM CIRCUIT_LOC records are generated the LINE_ITEM record will be associated with the ORIG Location. If a record was not created for CIRCUIT_LOC, then DataLoader shall leave LI.circuit_loc_id null. | N/A |
| | DTL | CHRG_CODE | LI.line_item_code | If not null, DataLoader shall insert DTL.chrg_code into LI.line_item_code. If null, DataLoader shall set LI.line_item_code = 'UNKNOWN'. | N/A |
| | DTL | CHRG_CODE_TYPE | LI.code_type_ind | If not null, DataLoader shall insert DTL.chrg_code_type into LI.code_type_ind. If null DataLoader shall set LI.code_type_ind = '30'. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | CHRG_SRV_EST_DATE | LI.svc_est_date | If not null, DataLoader shall insert DTL.chrg_srv_est_date into LI.svc_est_date. | N/A |
| | DTL | QTY2 | LI.svc_qty | DataLoader shall insert DTL.qty2 into LI.svc_qty. | N/A |
| | DTL | CHRG_DESC | LI.line_item_code_text | If not null, DataLoader shall insert DTL.chrg_desc into LI.line_item_code_text. | N/A |
| | DTL | EC_CIRCUIT_ID<br>TN | LI.source_type<br>LI.source_seq_id | If the DTL.ec_circuit_id or DTL.tn are not null, DataLoader shall set LI.source_type = 'CKT' and insert CCL.csr_circuit_listing_id into LI.source_seq_id.<br>If the DTL.ec_circuit_id and DTL.tn are null, DataLoader shall set LI.source_type = 'ACCT' and insert CA.csr_account_id into LI.source_seq_id. | N/A |
| | DTL | TERM_PLAN_ID | LI.plan_id | If not null, DataLoader shall insert DTL.term_plan_id into LI.plan_id. | N/A |
| | DTL | TERM_START_DATE | LI.term_agree_start_date | If not null, DataLoader shall insert DTL.term_start_date into LI.term_agree_start_date. | N/A |
| | DTL | TERM_END_DATE | LI.term_agree_end_date | If not null, DataLoader shall insert DTL.term_end_date into LI.term_agree_end_date. | N/A |
| | DTL | TERM_LENGTH | LI.length_of_term | If not null, DataLoader shall insert DTL.term_length into LI.length_of_term.<br>If null and DTL.term_start_date AND DTL.term_end_date are populated, then DataLoader shall calculate the number of months between the DTL.term_start_date and DTL.term_end_date and insert the calculated value into LI.length_of_term. | |
| | DTL | PIC | LI.pic | If not null, DataLoader shall insert DTL.pic into LI.pic. | N/A |
| | DTL | LPIC | LI.lpic | If not null, DataLoader shall insert DTL.lpic into LI.lpic | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | TN | LI.wtn | If not null, DataLoader shall insert DTL.tn into LI.wtn. | N/A |
| | DTL | CHRG_TYPE CHRG_BILLED_AMT | LID.line_item_dtl_id LID.line_item_id | Dataloader shall create a record in LINE_ITEM_DETAIL generating a unique line_item_dtl_id for each record where the DTL.chrg_type = 'MRC' and the DTL.chrg_billed_amt is not NULL or not equal to zero. DataLoader shall insert the corresponding LI.line_item_id into LID.line_item_id. | N/A |
| | DTL | QTY2 | LID.line_item_code_qty | DataLoader shall insert DTL.qty2 into LID.line_item_code_qty. | N/A |
| | DTL | BIP | LID.bip | If not null, DataLoader shall insert DTL.bip into LID.bip. | N/A |
| | DTL | RATCHET_FACTOR | LID.ratchet_factor | If not null, DataLoader shall insert DTL.ratchet_factor into LID.ratchet_factor. | N/A |
| | DTL | STATE | LID.state_code | If not null, DataLoader shall insert DTL.state into LID.state_code. | N/A |
| | DTL | ST_LVL_CO_CODE | LID.st_lvl_co_code | If not null, DataLoader shall insert DTL.st_lvl_co_code into LID.st_lvl_co_code. | N/A |
| | DTL | MILEAGE | LID.line_item_code_qty_2 | If no null, DataLoader shall insert DTL.mileage into LID.line_item_code_qty_2. | N/A |
| | DTL | MILEAGE | LID.line_item_code_rate_type_2 | If DTL.mileage is not null, DataLoader shall set LID.line_item_code_rate_type_2 = 'M'. | N/A |
| | DTL | CHRG_TYPE CHRG_BILLED_AMT | LIJD.line_item_jur_dtl_id LIJD.line_item_dtl_id | Dataloader shall create a record in LINE_ITEM_JUR_DTL generating a unique line_item_jur_dtl_id for each record where the DTL.chrg_type = 'MRC' and the DTL.chrg_billed_amt is not NULL or not equal to zero. DataLoader shall insert the corresponding LID.line_item_id into LIJD.line_item_jur_id. | N/A |

XIF Mapping

| 1. Req. # | 2. Source Record | 3. Source Field | 4. Destination Table.Field | 5. Population Rules | 6. Message |
|---|---|---|---|---|---|
| | DTL | JURISDICTION | LIJD.jur_ind | If not null, DataLoader shall insert DTL.jurisiction int LIJD.jur_ind. If DTL.jurisdiction is null LIJD.jur_ind = '0'. | N/A |
| | DTL | CHRG_BILLED_AMT | LIJD.amt | DataLoader shall insert DTL.chrg_billed_amt into LIJD.amt. | N/A |
| | DTL | RATE_ZONE_IND | LIJD.rate_zone_ind | If not null, DataLoader shall insert DTL.rate_zone_ind into LIJD.rate_zone_ind. | N/A |
| | DTL | UNIT_RATE | LIJD.unit_rate | If not null, DataLoader shall insert DTL.unit_rate. If DTL.unit_rate exceeds the length following the decimal, then DataLoader shall round the value to meet database constraints. If DTL.unit_rate exceeds whole number allowed by the database (to the left of the decimal) then DataLoader shall skip inserting value. | N/A |
| | DTL | CHRG_DISC_AMT | LIJD.disc_amt | If not null, DataLoader shall insert DTL.chrg_disc_amt into LIJD.disc_amt. | N/A |
| | DTL | PRICE_FLEX_IND | LIJD.pricing_flex_ind | If not null, DataLoader shall insert DTL.price_flex_ind into LIJD.pricing_flex_ind | N/A |
| | DTL | CHRG_TYPE SUMMARY_USAGE_IND CHRG_BILLED_AMT | RED.rate_ele_dtl_id RED.invoice_seq_id | Dataloader shall create a record in RATE_ELE_DTL generating a unique rate_ele_dtl_id for each record where the DTL.chrg_type = 'USG' and DTL.summary_usage_ind = '0' or is null and DTL.chrg_billed_amt is not null or equal to zero. DataLoader shall insert the corresponding I.invoice_seq_id into RED.invoice_seq_id. | N/A |
| | DTL | CHRG_BILLED_AMT CHRG_TYPE SUMMARY_USAGE_IND TN UNIT CHRG_CODE | RED.rate_ele_dtl_id RED.invoice_seq_id | Dataloader shall create a record in RATE_ELE_DTL generating a unique rate_ele_dtl_id for each group of records where the DTL.chrg_type = 'USG' and DTL.summary_usage_ind = '1' and | |

-continued

XIF Mapping

| 1. Req. # | 2. Source Record | 3. Source Field | 4. Destination Table.Field | 5. Population Rules | 6. Message |
|---|---|---|---|---|---|
| | | CHRG_CODE_TYPE | | the sum of DTL.chrg_billed_amt is not null or equal to zero. DataLoader shall group by the following fields when the DTL.summary_usage_ind = '1': | |
| | | JURISDICTION | | DTL.TN | |
| | | DIRECTIONALITY_IND | | DTL.UNIT | |
| | | END_OFC_ID | | DTL.CHRG_CODE | |
| | | TANDEM_ID | | DTL.CHRG_CODE_TYPE | |
| | | LATA | | DTL.JURISDICTION | |
| | | STATE | | DTL.DIRECTIONALITY_IND | |
| | | CIC | | DTL.END_OFC_ID | |
| | | ST_LVL_CO_CODE | | DTL.TANDEM_ID | |
| | | ORIG_COUNTRY_CODE | | DTL.LATA | |
| | | TERM_COUNTRY_CODE | | DTL.STATE | |
| | | RATE_PERIOD_IND | | DTL.CIC | |
| | | RATE_ZONE_IND | | DTL.ST_LVL_CO_CODE | |
| | | BIP | | DTL.ORIG_COUNTRY_CODE | |
| | | MRP1 | | DTL.TERM_COUNTRY_CODE | |
| | | MRP2 | | DTL.RATE_PERIOD_IND | |
| | | MRP1_TYPE | | DTL.RATE_ZONE_IND | |
| | | MRP2_TYPE | | DTL.BIP | |
| | | CELL_USG_IND | | DTL.MRP1 | |
| | | NPA_NXX | | DTL.MRP2 | |
| | | PIU | | DTL.MRP1_TYPE | |
| | | MSG_RATE_CLASS | | DTL.MRP2_TYPE | |
| | | MILEAGE_UNIT | | DTL.CELL_USG_IND | |
| | | FTR_GRP | | DTL.NPA_NXX | |
| | | | | DTL.PIU | |
| | | | | DTL.MSG_RATE_CLASS, DTL.VERT_FTR_IND, DTL.TRANS_RATE_ELE_IND, DTL.MILEAGE_UNIT, DTL.FTR_GRP, ORIG_CITY_CODE, TERM_CITY_CODE | |
| | | | | DataLoader shall insert the corresponding I.invoice_seq_id into RED.invoice_seq_id. | |
| | DTL | TN | RED.tn | DataLoader shall populate the DTL.tn for the group into RED.tn. | N/A |
| | DTL | CHRG_FROM_DATE | RED.cycle_start | DataLoader shall take the oldest DTL.chrg_from_date for the RED group and insert into RATE_ELE_DTL.cycle_start. | N/A |
| | | CHRG_THRU_DATE | RED.cycle_stop | | |

-continued

XIF Mapping

| 1. Req. # | 2. Source Record | 3. Source Field | 4. Destination Table.Field | 5. Population Rules | 6. Message |
|---|---|---|---|---|---|
| | DTL | CHRG_CODE | RED.element_id RED.traffic_type_ind | DataLoader shall take the newest DTL.chrg_thru_date for the RED group and insert in RATE_ELE_DTL.cycle_stop. DataLoader shall insert the DTL.chrg_code into RED.element_id and RED.traffic_type_ind. DataLoader shall truncate the DTL.chrg_code if value exceeds database constraint. If no value is retrieved, then DataLoader shall set RED.element_id = 'UNKN' and RED.traffic_type_ind = 'UNKN'. | N/A |
| | DTL | CHRG_CODE_TYPE | RED.record_type | DataLoader shall insert DTL.chrg_code_type into RED.record_type. DataLoader shall truncate the DTL.chrg_code if value exceeds database constraint. If null, DataLoader shall set RED.record_type = '0'. | N/A |
| | DTL | JURISDICTION | RED.jur_ind | If not null, DataLoader shall insert DTL.jurisiction into RED.jur_ind. If DTL.jurisdiction is null RED.jur_ind = '0'. | N/A |
| | DTL | CHRG_BILLED_AMT | RED.usage_billed_amt | DataLoader shall provide a sum of the DTL.chrg_billed_amt from all CDR records contained within a group and the summed value shall be populated in the RED.usage_billed_amt. | N/A |
| | DTL | DIRECTIONALITY_IND | RED.directionality_ind | If not null, DataLoader shall insert DTL.directionality_ind into RED.directionality_ind. If null, DataLoader shall set RED.directionality = '0'. | N/A |
| | DTL | DIRECTIONALITY_IND | RED.traffic_type | If not null for the group and DTL.directionality_ind = '1', then DataLoader shall set RED.traffic_type = 'ORIG'. If not null for the group and DTL.directionality_ind = '2', then DataLoader shall set RED.traffic_type = 'TERM'. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | END_OFC_ID TANDEM_OFC_ID | RED.summary_ofc_id RED.summary_ofc_id_ind | If null for the group or DTL.directionality_ind != '1' or != '2'. then DataLoader shall set RED.traffic_type = "OTHR'. If DTL.end_ofc_id is not null for the RED group, DataLoader shall insert DTL.end_ofc_id into RED.summary_ofc_id and set RED.summary_ofc_id_ind = '0'. If DTL.end_ofc_id is null and DTL.tandem_id is not null for the RED group, DataLoader shall insert DTL.tandem_id into RED.summary_ofc_id and set RED.summary_ofc_id_ind = '1'. | N/A |
| | DTL | LATA | RED.lata | If not null for the group, DataLoader shall insert DTL.lata into RED.lata. | N/A |
| | DTL | STATE | RED.state_code | If not null for the group, DataLoader shall insert DTL.state into RED.state_code. | N/A |
| | DTL | ST_LVL_CO_CODE | RED.st_lvl_co_code | If not null for the group, DataLoader shall insert DTL.st_lvl_co_code into RED.st_lvl_co_code. | N/A |
| | DTL | CIC | RED.cic | If not null for the group, DataLoader shall insert DTL.cic into RED.cic. | N/A |
| | DTL | ORIG_COUNTRY_CODE TERM_COUNTRY_CODE | RED.country_code | If not null for the group, DataLoader shall insert DTL.orig_country_code into RED.country_code. If DTL.orig_country_code is null and DTL.term_country_code is not null, then DataLoader shall insert DTL.term_country_code into RED.country_code. Otherwise leave null. | N/A |
| | DTL | UNIT_RATE | RED.usage_rate | If not null for the group, DataLoader shall insert DTL.unit_rate into RED.usage_rate. | N/A |
| | DTL | RATE_PERIOD_IND | RED.rate_period_ind | If not null for the group, DataLoader shall insert DTL.rate_period_ind into RED.rate_period_ind. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | RATE_ZONE_IND | RED.rate_zone_ind | If not null for the group, DataLoader shall insert DTL.rate_zone_ind into RED.rate_zone_ind. | N/A |
| | DTL | TANDEM_ID | RED.tandem_id | If not null for the group, DataLoader shall insert DTL.tandem_id into RED.tandem_id. | N/A |
| | DTL | CHRG_TYPE CHRG_BASE_AMT CHRG_DISC_AMT | DD.disc_dtl_id DD.rate_ele_dtl_id | Dataloader shall create a record in DISC_DTL generating a unique disc_dtl_id for the group where the DTL.chrg_type = 'USG' and one or more of the following fields is populated for the record: DTL.chrg_base_amt DTL.chrg_disc_amt DataLoader shall insert the corresponding RED.rate_ele_dtl_id into DD.rate_ele_dtl_id. | N/A |
| | DTL | CHRG_BASE_AMT | DD.base_amt | If not null for the group, DataLoader shall sum DTL.chrg_base_amt and insert the calculated value into DD.base_amt. If null for the group and DTL.chrg_disc_amt is not null, then DataLoader shall calculate the DD.base_amt using the following formula: (SUM of DTL.chrg_disc_amt) = DD.chrg_base_amt + SUM of DTL.chrg_billed_amt | N/A |
| | DTL | CHRG_BASE_AMT CHRG_DISC_AMT | DD.disc_amt | If not null for the group, DataLoader shall sum DTL.chrg_disc_amt and insert the calculated value into DD.disc_amt. If null for the group and DTL.chrg_base_amt is not null, then DataLoader shall calculate the DD.disc_amt using the following formula: (SUM of DTL.chrg_base_amt − SUM of DTL.chrg_billed_amt) = DD.disc_amt | N/A |

-continued

XIF Mapping

| 1. Req. # | 2. Source Record | 3. Source Field | 4. Destination Table.Field | 5. Population Rules | 6. Message |
|---|---|---|---|---|---|
| | | | DD.disc_pct | If the DD.base_amt is not null, DataLoader shall calculate the DD.disc_pct using the following calculation: (DD.disc_amt/DD.base_amt) = DD.disc_pct | N/A |
| | DTL | BIP | MPBD.mpb_dtl_id MPBD.rate_ele_dtl_id | Dataloader shall create a record in MPB_DTL generating a unique mpb_dtl_id for the group where the DTL.chrg_type = 'USG' and one or more of the following fields is populated for the record: DTL.bip DataLoader shall insert the corresponding RED.rate_ele_dtl_id into MPBD.rate_ele_dtl_id. | N/A |
| | DTL | BIP | MPBD.bip | If not null for the RED group, DataLoader shall insert dtl.bip into MPBD.bip. | N/A |
| | DTL | MILEAGE MILEAGE_UNIT MRP1 MRP2 MRP1_TYPE MRP2_TYPE | MD.mileage_dtl_id MD.rate_ele_dtl_id | Dataloader shall create a record in MILEAGE_DTL generating a unique mileage_dtl_id for the group where the DTL.chrg_type = 'USG' and one or more of the following fields is populated for the record: DTL.mileage DTL.mileage_unit DTL.mrp1 DTL.mrp2 DTL.mrp1_type DTL.mrp2_type DataLoader shall insert the corresponding RED.rate_ele_dtl_id into MD.rate_ele_dtl_id. | N/A |
| | DTL | MILEAGE | MD.mileage_qty | If not NULL for the group, DataLoader shall sum DTL.mileage and insert calculated value into MD.mileage_qty. | N/A |
| | DTL | MILEAGE_UNIT | MD.unit | If not NULL for the group, DataLoader shall insert DTL.mileage_unit into MD.unit. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | MRP1 | MD.rating_point1_ofc_id | If not null for the group DataLoader shall insert DTL.mrp1 into MD.rating_point1_ofc_id. | N/A |
| | DTL | MRP2 | MD.rating_point2_ofc_id | If not null for the group, DataLoader shall insert DTL.mrp2 into MD.rating_point2_ofc_id. | N/A |
| | DTL | MRP1_TYPE | MD.rating_point1_ofc_id_ind | If not null for the group, DataLoader shall insert DTL.mrp1_type into MD.rating_point1_ofc_id_ind. | N/A |
| | DTL | MRP2_TYPE | MD.rating_point2_ofc_id_ind | If not null for the group, DataLoader shall insert DTL.mrp2_type into MD.rating_point2_ofc_id_ind. | N/A |
| | DTL | CELL_USG_IND NPA_NXX PIU | UD.usage_dtl_id UD.rate_ele_dtl_id | Dataloader shall create a record in USAGE_DTL generating a unique usage_dtl_id for the group where the DTL.chrg_type = 'USG' and one or more of the following fields is populated for the record: DTL.cell_usg_ind DTL.npa_nxx DTL.piu DTL.ftr_grp DTL.trans_rate_ele_ind DTL.vert_ftr_ind DataLoader shall insert the corresponding RED.rate_ele_dtl_id into UD.rate_ele_dtl_id. | |
| | DTL | CELL_USG_IND | UD.cellular_usage_ind | If not null for the group, DataLoader shall insert DTL.cell_usg_ind into UD.cellular_usage_ind. | N/A |
| | DTL | NPA_NXX | UD.npa_nxx | If not null for the group, DataLoader shall insert DTL.npa_nxx into UD.npa_nxx. | N/A |
| | DTL | PIU | UD.piu | If not null for not greater than 100 for the group, DataLoader shall insert DTL.piu into UD.piu otherwise leave null. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | TN<br>MSG_RATE_CLASS | LUD.local_usage_dtl_id<br>LUD.rate_ele_dtl_id | Dataloader shall create a record in LOCAL_USAGE_DTL generating a unique local_usage_dtl_id for the group where the DTL.chrg_type = 'USG' and one or more of the following fields is populated for the record:<br>DTL.tn<br>DTL.msg_rate_class<br>OR<br>Record(s) meet the criteria for loading LOCAL_CALL_DTL, then DataLoader must create a LUD record to link the LCD record back to RED Table. DataLoader shall insert the corresponding RED.rate_ele_dtl_id into LUD.rate_ele_dtl_id. | N/A |
| | DTL | TN | LUD.tn | If not null for the group, then DataLoader shall insert DTL.tn into LUD.tn. | N/A |
| | DTL | MSG_RATE_CLASS | LUD.msg_rate_class | If not null for the group, then DataLoader shall insert DTL.msg_rate_class into LUD.msg_rate_class. | N/A |
| | DTL | CHRG_TYPE<br>QTY1<br>UNIT | REQ.rate_ele_qty_id<br>REQ.rate_ele_dtl_id<br>REQ.qty<br>REQ.unit<br>REQ.usage_summary_ind | Dataloader shall create record(s) in RATE_ELE_QTY generating a unique rate_ele_qty1_id for the group where the DTL.chrg_type = 'USG' and the following conditions have been met:<br>DataLoader shall sum of the DTL.qty1 for group and where the resulting sum is not null or equal to zero then DataLoader shall create a record in RATE_ELE_QTY generating a unique REQ.rate_ele_qty_id. Then DataLoader shall insert the sum of DTL.qty1 for the RATE_ELE_DTL group by into REQ.qty. DataLoader shall populate the corresponding | N/A |

-continued

XIF Mapping

| 1. Req. # | 2. Source Record | 3. Source Field | 4. Destination Table.Field | 5. Population Rules | 6. Message |
|---|---|---|---|---|---|
| | | | | REQ.rate_ele_dtl_id for the group by, populate REQ.usage_summary_ind equal to '1', and insert DTL.unit into REQ.unit. DataLoader shall count the number of records rolled up into the RATE_ELE_DTL group by and populate the count into REQ.qty. On the insert into RATE_ELE_QTY generate a unique rate_ele_qty_id, populate the corresponding REQ.rate_ele_dtl_id, and populate Unit equal to '01'. DataLoader shall populate REQ.usage_summary_ind with '1', if no other record was not created in RATE_ELE_QTY. Otherwise populate REQ.usage_summary_ind with '0'. | |
| | | | US | DataLoader shall use the standard Usage Summary function for populating the USAGE_SUMMARY table. The only deviations from the standard will be the omission of the batchid and will not rely on USAGE_STATISTICS_DETAIL. | N/A |
| | DTL | CHRG_TYPE CHRG_BILLED_AMT ORIG_TN TERM_TN ORIG_CITY TERM_CITY ORIG_STATE TERM_STATE ORIG_COUNTRY TERM_COUNTRY | LCD.local_call_dtl_id LCD.local_usage_dtl_id | Dataloader shall create a record in LOCAL_CALL_DTL generating a unique local_usage_dtl_id for each record where the DTL.chrg_type = 'USG' and one or more of the following fields is populated for the record: DTL.charge_billed_amt ! = '0' or NULL. DTL.orig_tn DTL.term_tn DTL.orig_city DTL.term_city DTL.orig_state DTL.term_state | N/A |

-continued

| 1. Req. # | 2. Source Record | 3. Source Field | XIF Mapping | | |
|---|---|---|---|---|---|
| | | | 4. Destination Table.Field | 5. Population Rules | 6. Message |
| | | | | DTL.orig_country DTL.term_country DataLoader shall insert the corresponding LUD.local_usage_dtl_id into LCD.local_usage_dtl_id. Note: If all fields listed above are nul except charge_billed_amt do not generate a record in the LCD. | |
| | DTL | CHRG_FROM_DATE CHRG_THRU_DATE | LCD.call_date | If DTL.chrg_from_date is not null, then DataLoader shall insert DTL.chrg_from_date into LCD.call_date. If DTL.chrg_from_date is null and DTL.chrg_thru_date is not null, then DataLoader shall insert DTL.chrg_thru_date into LCD.call_date. Otherwise leave null. | N/A |
| | DTL | ORIG_TN | LCD.from_tn | If not null, DataLoader shall insert DTL.orig_tn into LCD.from_tn. | N/A |
| | DTL | TERM_TN | LCD.to_tn | If not null, DataLoader shall insert DTL.term_tn into LCD.to_tn. | N/A |
| | DTL | ORIG_CITY | LCD.from_city | If not null, DataLoader shall insert DTL.orig_city into LCD.from_city. | N/A |
| | DTL | TERM_CITY | LCD.to_city | If not null, DataLoader shall insert DTL.term_city into LCD.to_city. | N/A |
| | DTL | ORIG_STATE | LCD.from_state | If not null, DataLoader shall insert DTL.orig_state into LCD.from_state. | N/A |
| | DTL | TERM_STATE | LCD.to_state | If not null, DataLoader shall insert DTL.term_state into LCD.to_state. | N/A |
| | DTL | ORIG_COUNTRY | LCD.from_country | If not null, DataLoader shall insert DTL.orig_country into LCD.from_country. | N/A |
| | DTL | TERM_COUNTRY | LCD.to_country | If not null, DataLoader shall insert DTL.term_country into LCD.to_country. | N/A |

XIF Mapping

| 1. Req. # | 2. Source Record | 3. Source Field | 4. Destination Table.Field | 5. Population Rules | 6. Message |
|---|---|---|---|---|---|
| | DTL | QTY1 UNIT FRAC_MOU_IND | LCD.call_duration_mou LCD.call_duration_sec | If DTL.unit = '02' or '03' and DTL.frac_mou_ind is null or equal to zero then insert DTL.qty1 into LCD.call_duration_mou. If DTL.unit = '02' or '03' and DTL.frac_mou_ind = '1' then populate whole number value (left of decimal) into LCD.Call_Duration_MOU. Convert fractional value (right of decimal) into seconds by multiplying fractional value × 60 and insert converted value into LCD.Call_Duration_SEC. If DTL.unit = '12' then insert DTL.qty1 into LCD.call_duration_sec | N/A |
| | DTL | CHRG_BILLED_AMT | LCD.call_usage_amt | DataLoader shall insert DTL.chrg_billed_amt into LCD.call_usage_amt. | N/A |
| | DTL | CHRG_DISC_AMT | LCD.disced_usage_amt | If not null, DataLoader shall insert DTL.chrg_disc_amt into LCD.disced_usage_amt. | N/A |
| | | | ICM | DataLoader shall use the standard Invoice Circuit Master function for populating the INVOICE_CIRCUIT_MASTER table. The only deviation from the standard will be the omission of the batchid if the SUM.source_type = 'MAN' or 'SCAN' | N/A |
| | SUM | SOURCE_TYPE | ALL.batchid | DataLoader shall store the invoice in DRAFT MODE if the SUM.source_type = 'MAN' or 'SCAN'. Otherwise, DataLoader shall load the invoice in ELECTRONIC MODE. When loading in DRAFT MODE the batchid for all populated tables will remain null. When loading in ELECTRONIC MODE the batchid will populated for all tables where data is loaded for the invoice. | N/A |

-continued

| 1. Req. # | 2. Source Record | 3. Source Field | 4. Destination Table.Field | XIF Mapping | |
|---|---|---|---|---|---|
| | | | | 5. Population Rules | 6. Message |
| | DTL | CHRG_TYPE<br>CHRG_CODE_TYPE<br>CHRG_CODE<br>CHRG_DESC | LINE_ITEM.csr_glossary_id<br>CSR_GLOSSARY.csr_glossary_id<br>CSR_GLOSSARY.code_type_ind<br>CSR_GLOSSARY.line_item_code<br>CSR_GLOSSARY.line_item_code_desc | DataLoader shall verify that the XIF.chrg_code exists in CSR_GLOSSARY where the XIF.chrg_type = 'MRC' and CSR_GLOSSARY.line_item_code = value and the CSR_GLOSSARY.code_type_ind = '30' where DTL.chrg_code_type is null.<br>-or-<br>and the CSR_GLOSSARY.code_type_ind = DTL.chrg_code_type when the field is not null..<br>If the combination already exists in CSR_GLOSSARY, insert the csr_glossary_id into LINE_ITEM.csr_glossary_id. If the DTL.chrg_code is NULL, then DataLoader shall use the value = 'UNKNOWN' when attempting to search the CSR_GLOSSARY table for a match..<br>If the combination does not exist, DataLoader shall generate a record in CSR_GLOSSARY creating a unique csr_glossary_id, set CSR_GLOSSARY.code_type_ind = '30' where DTL.chrg_code_type is null.<br>-or-<br>set CSR_GLOSSARY.code_type_ind = DTL.chrg_code_type when the field is not null.<br>Then insert DTL.chrg_code into CSR_GLOSSARY.line_item_code or insert 'UNKNOWN' if the DTL.chrg_code was null, and insert DTL.chrg_desc into CSR_GLOSSARY.line_item_code_desc. | N/A |

-continued

XIF Mapping

| 1. Req. # | 2. Source Record | 3. Source Field | 4. Destination Table.Field | 5. Population Rules | 6. Message |
|---|---|---|---|---|---|
| | | | | DataLoader shall insert the csr_glossary_id generated for the new CSR_GLOSSARY record into LINE_ITEM.csr_glossary_id. At the end of the Invoice load kick off the balance entry procedure. Note: The requirements are found in SS TTS\Special Projects\Sprint\Phase II Development\Outstanding Balance Design.doc | N/A |
| | SUM | VENDOR_NAME | BL.remarks | If not null, DataLoader shall insert SUM.vendor_name into BL.remarks when new BAN_LIST records are created. | N/A |
| | SUM | MASTER_ACCT_NUM ACCT_NUM | SA.sub_account_id SA.invoice_seq_id | If the SUM.master_acct_num is not null and does not equal SUM.acct_num, then create a new record in SUB_ACCOUNT generating a unique SA.sub_account_id. DataLoader shall insert the corresponding I.invoice_seq_id for the Master Invoice into SA.invoice_seq_id. | N/A |
| | SUM | MASTER_ACCT_NUM ACCT_NUM TOT_DUE_AMT | SA.sub_account_total | If the SUM.master_acct_num is not null and does not equal SUM.acct_num, then insert SUM.tot_due_amt into SA.sub_account_total. | N/A |
| | SUM | MASTER_ACCT_NUM ACCT_NUM | SA.sub_account_num | If the SUM.master_acct_num is not null and does not equal SUM.acct_num, then DataLoader shall insert SUM.acct_num into SA.sub_account_num. | N/A |
| | TRL | SA.sub_account_num | I.sub_account_total | If SUM.master_acct_num is not null and SUM.master_acct_num = SUM.acct_num, then DataLoader shall sum SA.sub_account_total for all | N/A |

-continued

XIF Mapping

| 1. Req. # | 2. Source Record | 3. Source Field | 4. Destination Table.Field | 5. Population Rules | 6. Message |
|---|---|---|---|---|---|
| | | | | records where the I.invoice_seq_id = SA.invoice_seq_id and insert the calculated value into I.sub_account_total. This operation must occur prior to re-calculating the I.total_due for the Master Invoice. | |
| | DTL | FTR_GRP | UD.ftr_grp | If not null for the group, DataLoader shall insert DTL.ftr_grp into UD.ftr_grp. | N/A |
| | DTL | CKT_CLASS_CODE | CCL.class_of_circuit | If not null, DataLoader shall insert DTL.ckt_class_code into CCL.class_of_circuit from the first record in the group. | N/A |
| | DTL | CKT_CLASS_CODE_TYPE | CCL.class_of_circuit_ind | If not null, DataLoader shall insert DTL.ckt_class_code_type into CCL.class_of_circuit_ind from the first record in the group. | N/A |
| | DTL | ORIG_CITY_CODE TERM_CITY_CODE | RED.intl_city_code | If not null for the group, DataLoader shall insert DTL.orig_city_code into RED.intl_city_code. If DTL.orig_city_code is null and DTL.term_city_code is not null, then DataLoader shall insert DTL.term_city_code into RED.intl_city_code. Otherwise leave null. | N/A |
| | DTL | TRANS_RATE_ELE_IND | UD.transport_rate_ele_ind | If not null for the group, DataLoader shall insert DTL.trans_rate_ele_ind into UD.transport_rate_ele_ind. | N/A |
| | DTL | VERT_FTR_IND | UD.vertical_features_ind | If not null for the group, DataLoader shall insert DTL.vert_ftr_ind into UD.vertical_features_ind. | N/A |

-continued

XIF Mapping

| 1. Req. # | 2. Source Record | 3. Source Field | 4. Destination Table.Field | 5. Population Rules | 6. Message |
|---|---|---|---|---|---|
| | DTL | SEC_NCI_CODE | CL.nci_code | If not null, DataLoader shall insert DTL.sec_nci_code into CL.nci_code for the terminating location record. | N/A |
| | DTL | ACCESS_SVC_GRP | AO.access_service_group | If not null. DataLoader shall insert DTL.access_svc_grp into AO.access_service_group | N/A |
| | DTL | TRANS_AMT | RED.Transport_Billed_Amt | DataLoader shall provide a sum of the DTL.trans_amt from all CDR records contained within a group and the summed value shall be populated in the RED.transport_billed_amt. | N/A |
| | DTL | ACCESS_AMT | RED.Access_Billed_Amt | DataLoader shall provide a sum of the DTL.access_amt from all CDR records contained within a group and the summed value shall be populated in the RED.access_billed_amt. | N/A |

| GLOSSARY | |
|---|---|
| 7. Table Name | 8. Abbreviation |
| BAN_LIST | BL |
| CIRCUIT_LOC | CL |
| CSR_ACCOUNT | CA |
| CSR_CIRCUIT_LISTING | CCL |
| DISC_DTL | DD |
| INVOICE | I |
| INVOICE_CIRCUIT_MASTER | ICM |
| JUR_DTL | JD |
| LINE_ITEM | LI |
| LINE_ITEM_DTL | LID |
| LINE_ITEM_JUR_DTL | LIJD |
| LOCAL_CALL_DTL | LCD |
| LOCAL_USAGE_DTL | LUD |
| LPC_DETAIL | LD |
| MILEAGE_DTL | MD |
| MPB_DTL | MPBD |
| OCC_ADJ_CIRCUIT_DTL | OACD |
| OCC_ADJ_DTL | OAD |
| OCC_TOTAL | OT |
| PLAN_DISC_DTL | PDD |
| RATE_ELE_DTL | RED |
| RATE_ELE_QTY | REQ |
| SUB_ACCOUNT | SA |
| TAX_SURCHARGE_DETAIL | TSD |
| USAGE_DTL | UD |
| USAGE_SUMMARY | US |
| VENDOR_PAYMENT_RECEIVED | VPR |

An Example Telecommunications Environment

The present invention is described in terms of an example environment. The example environment may include a multiple carriers telecommunications environment. In an exemplary embodiment, the carriers may use any of a range of well known circuit switched and packet switched technologies, as well as telephony, video, audio, broadcast, and/or other data. The multiple telecommunications carriers may include US domestic entities (see Definitions below in Table 4) such as, e.g., ILECs, CLECs, IXCs, NGTs and Enhanced Service Providers (ESPs), as well as global entities such as PTTs and NEs, recognized by those skilled in the art. In addition, as used herein a telecommunications system may include domestic systems used by entities such as, e.g., ILECs, CLECs, IXCs and Enhanced Service Providers (ESPs), as well as global systems recognized by those skilled in the art.

The communications systems according to exemplary embodiments of the present invention may include wireless communication systems as well as wired line communications. The present invention may also be used in packetized and voice over Internet Protocol (VoIP) communications environments.

In an exemplary embodiment, many of these entities may issue invoices to their end customers. In addition, many of these entities may also issue invoices related to intercarrier charges to one another. Exemplary, but not limiting telecommunications charges, which may include, e.g., intercarrier charges may include, e.g., but without limitation, in exemplary embodiments, call detail records (CDRs), facility cost records (FCRs), voice over Internet Protocol (VoIP) records, packet records, wireless, content, ringtone, audio, video, broadcast, and other usage, facility and other charges.

In an exemplary embodiment, call usage call detail records (CDRs) may include usage information such as, e.g., but not limited to, billing access number, the phone number, call duration, etc., and/or other invoice data records, for calls purchased at wholesale, may be sent from an IXC to a LEC in, e.g., but not limited to a data format such as, e.g., but not limited to, an EDI 811 format. The invoice data records which have been sent to the LEC may then be processed by XTrak according to an exemplary embodiment of the present invention, into a format which may be imported into Bill Track Pro. The data may be processed for validation, processing, audit, and/or payment. Similarly, other types of data records may be sent from a carrier to the LEC for processing/billing, including, e.g., broadband access, data access, VoIP, wireless download, music, ringtones, audio, video, alerts, broadcasts, packets, content, etc.

In another exemplary embodiment, facilities invoice data records may be provided from an IXC or one LEC to another LEC. Such records might include, e.g., but not limited to, mileage characteristics, rate charges, throughput characteristics, etc. and might be for a T1, a T3, an OC3, a point-to-point circuit, etc. The invoice data may then be processed according to an exemplary embodiment of the present invention and may then be, e.g., but not limited to, validated, processed, audited, and/or paid.

In the exemplary embodiment, data and voice traffic may be transported over a heterogeneous network including telecommunications equipment and facilities of any of a number of the carriers or entities.

In an exemplary embodiment, invoices may be provided in electronic form to the telecommunications invoice processing entity. In one exemplary embodiment, the invoices may be provided from at least one of the telecommunications carriers in an electronic form (e.g., transmitted electronically over a network such as, e.g., but not limited to, the Internet, and/or may be provided on a computer-readable medium such as, e.g., but not limited to, a compact disc read only memory (CD-ROM), and/or digital versatile disc (DVD), or the like. In an exemplary embodiment, the invoice data may be in a form of a print data stream, which may be intercepted for storage and/or transmission, prior to, or instead of sending to a printer. Exemplary print data streams, according to an exemplary embodiment, as shown in Table 1 above, may include, e.g., but not limited to, a text (.txt) format such as, e.g., an ASCII code, or the like, character format, a print format (.prn) such as, e.g., a MICROSOFT® WINDOWS® print file format, a MICROSOFT® database format (.mdb), a Tag image bitmap file (TIFF) (.tif), Microsoft® Excel® Spreadsheet (.xls), A dBASE file, a format originated by Ashton-Tate (.dbf), a portable document file such as, e.g., but not limited to, ADOBE® ACROBAT® format (.pdf), Borland® Paradox® 7 table database (.db), and/or a Web page, and/or a hypertext or markup language such as, e.g., but not limited, a file containing Hypertext Markup Language (HTML) (.htm), etc.

Although the invention is described in terms of this example environment, it is important to note that description in these terms is provided for purposes of illustration only. It is not intended that the invention be limited to this example environment or to the precise inter-operations between the above-noted entities and devices. In fact, after reading the following description, it will become apparent to a person skilled in the relevant art how to implement the invention in alternative environments.

DEFINITIONS

Table 4 below defines common telecommunications terminology. These terms are used throughout the remainder of the description of the invention.

TABLE 4

| Term | Definition |
| --- | --- |
| access tandem (AT) | An AT is a class ¾ switch may be used to switch calls between EOs in a LATA. An AT may provide subscribers access to the IXCs, to provide long distance calling services. An access tandem may be a network node. Other network nodes may include, for example, but not limited to, a CLEC, or other enhanced services provider (ESP), an international gateway or global point-of-presence (GPOP), or an intelligent peripheral(IP). |
| bearer (B) channels | Bearer (B) channels are digital channels may be used to carry both digital voice and digital data information. An ISDN bearer channel is 64,000 bits per second, which can carry PCM-digitized voice or data. |
| called party | The called party is the caller receiving a call sent over a network at the destination or termination end. |
| calling party | The calling party is the caller placing a call over any kind of network from the origination end. |
| central office (CO) | A CO is a facility that houses an EO homed. EOs are often called COs. |
| class 1 switch | A class 1 switching office, the Regional Center(RC), is the highest level of local and long distance switching, or "office of last resort" to complete a call. |
| class 3 switch | A class 3 switching office is a Primary Center (PC); an access tandem (AT) has class 3 functionality. |
| class 4 switch | A class 4 switching office is a Toll Center (TC) if operators is present or else a Toll Point (TP); an access tandem (AT) has class 4 functionality. |
| class 5 switch | A class 5 switching office is an end office (EO) or the lowest level of local and long distance switching, a local central office. The switch closest to the end subscriber. |
| competitive LEC (CLEC) | CLECs are telecommunications services providers of local services that can compete with ILECs. Level 3 Communications is an example. A CLEC may or may not handle IXC services as well. |
| competitive access providers (CAPS) | Teligent and Winstar were examples. |
| customer premises equipment (CPE) | CPE refers to devices residing on the premises of a customer and used to connect to a telephone network, including ordinary telephones, key telephone systems, PBXs, video conferencing devices and modems. |
| digitized data (or digital data) | Digitized data refers to analog data that has been sampled into a binary representation (i.e., including sequences of 0's and 1's). Digitized data is less susceptible to noise and attenuation distortions because it is more easily regenerated to reconstruct the original signal. |
| egress end office | The egress EO is the node or destination EO with a direct connection to the called party, the termination point. The called party is "homed" to the egress EO. |
| egress | Egress refers to the connection from a called party or termination at the destinaton end of a network, to the serving wire center (SWC). |
| end office (EO) | An EO is a class 5 switch used to switch local calls within a LATA. Subscribers of the LEC are connected ("homed") to EOs, meaning that EOs are the last switches to which the subscribers are connected. |
| Enhanced Service Provider (ESP) | A network services provider. |
| equal access | 1 + dialing as used in US domestic calling for access to any long distance carrier as required under the terms of the modified final judgement (MFJ) requiring divestiture of the Regional Bell Operating Companies (RBOCs) from their parent company, AT&T. |
| global point of presence (GPOP) | A GPOP refers to the location where international telecommunications facilities and domestic facilities interface, an international gateway POP. |
| incumbent LEC (ILEC) | ILECs are traditional LECs in the US, which are the Regional Bell Operating Companies (RBOCs). Bell South and US West are examples. ILEC can also stand for an independent LEC such as a GTE. |
| ingress end office | The ingress EO is the node or serving wire center (SVC) with a direct connection to the calling party, the origination point. The calling party is "homed" to the ingress EO. |
| ingress | Ingress refers to the connection from a calling party or origination. |
| integrated service digital network (ISDN) basic rate interface (BRI) line | An ISDN Basic Rate Interface (BRI) line provides 2 bearer B channels and 1 data D line (known as "2B + D" over one or two pairs) to a subscriber. |
| integrated services digital network (ISDN) | ISDN is a network that provides a standard for communications (voice, data and signaling), end-to-end digital transmission circuits, out-of-band signaling, and a features significant amount of bandwidth. |

TABLE 4-continued

| Term | Definition |
| --- | --- |
| inter machine trunk (IMT) | An inter-machine trunk (IMT) is a circuit between two commonly-connected switches. |
| inter-exchange carrier (IXC) | IXCs are US domestic long distance telecommunications services providers. AT&T, MCI, Sprint, are examples. |
| internet protocol (IP) | IP is part of the TCP/IP protocols. It is used to recognize incoming messages, route outgoing messages, and keep track of Internet node addresses (using a number to specify a TCP/IP host on the Internet). IP corresponds to the network layer of OSI. |
| Internet service provider (ISP) | An ISP is a company that provides Internet access to subscribers. |
| ISDN primary rate interface (PRI) | An ISDN Primary Rate Interface (PRI) line provides the ISDN equivalent of a T1 circuit. The PRI delivered to a customer's premises can provide 23B + D (in North America) or 30B + D (in Europe) channels running at 1.544 megabits per second and 2.048 megabits per second, respectively. |
| local exchange carrier (LEC) | LECs are local telecommunications services providers. Bell Atlantic and US West are examples. |
| local access and transport area (LATA) | A LATA is a region in which a LEC offers services. There are over 160 LATAs of these local geographical areas within the United States. |
| local area network (LAN) | A LAN is a communications network providing connections between computers and peripheral devices (e.g., printers and modems) over a relatively short distance (e.g., within a building) under standardized control. |
| modified final judgment (MFJ) | Modified final judgment (MFJ) was the decision requiring divestiture of the Regional Bell Operating Companies (RBOCs) from their parent company, AT&T. |
| network node | A network node is a generic term for the resources in a telecommunications network, including switches, DACS, regenerators, etc. Network nodes essentially include all non-circuit (transport) devices. Other network nodes can include, for example, equipment of a CLEC, or other enhanced service provider (ESP), a point-of-presence (POP), an international gateway or global point-of-presence (GPOP). |
| new entrant (NE) | A new generation global telecommunications. |
| next generation telephone (NGT) | A new telecommunications services provider, especially IP telephony providers. Examples are Level 3 and Qwest. |
| packetized voice or voice over a backbone | One example of packetized voice is voice over internet protocol (VOIP). Voice over packet refers to the carrying of telephony or voice traffic over a data network, e.g. voice over frame, voice over ATM, voice over Internet Protocol (IP), over virtual private networks (VPNs), voice over a backbone, etc. |
| Pipe or dedicated communications facility | A pipe or dedicated communications facility connects an ISP to the internet. |
| point of presence (POP) | A POP refers to the location within a LATA where the IXC and LEC facilities interface. |
| point-to-point tunneling protocol (PPTP) | A virtual private networking protocol, point-to-point tunneling protocol (PPTP), can be used to create a "tunnel" between a remote user and a data network. A tunnel permits a network administrator to extend a virtual private network (VPN) from a server (e.g., a Windows NT server) to a data network (e.g., the Internet). |
| point-to-point (PPP) protocol | PPP is a protocol permitting a computer to establish a connection with the Internet using a modem. PPP supports high-quality graphical front ends, like Netscape. |
| postal telephone telegraph (PTT) | State regulated telephone companies, many of which are being deregulated. NTT is an example. |
| private branch exchange (PBX) | A PBX is a private switch located on the premises of a user. The user is typically a private company which desires to provide switching locally. |
| private line with a dial tone | A private line is a direct channel specifically dedicated to a customer's use between two specified points. A private line with a dial tone can connect a PBX or an ISP's access concentrator to an end office (e.g. a channelized T1 or PRI). A private line can also be known as a leased line. A private line may also be referred to as a facility. |
| public switched telephone network (PSTN) | The PSTN is the worldwide switched voice network. |
| regional Bell operating companies (RBOCs) | RBOCs are the Bell operating companies providing LEC services after being divested from AT&T. |

TABLE 4-continued

| Term | Definition |
|---|---|
| signaling system 7 (SS7) | SS7 as a type of common channel interoffice signaling (CCIS) used widely throughout the world. The SS7 network provides the signaling functions of indicating the arrival of calls, transmitting routing and destination signals, and monitoring line and circuit status. |
| switching hierarchy or office classification | An office class is a functional ranking of a telephone central office switch depending on transmission requirements and hierarchical relationship to other switching centers. Prior to AT&T's divestiture of the RBOCs, an office classification was the number assigned to offices according to their hierarchical function in the U.S. public switched network (PSTN). The following class numbers are used: class 1 = Regional Center(RC), class 2 = Sectional Center (SC), class 3 = Primary Center (PC), class 4 = Toll Center (TC) if operators are present or else Toll Point (TP), class 5 = End Office (EO) a local center office. Any one center handles traffic from one to two or more centers lower in the hierarchy. Since divestiture and with more intelligent software in switching offices, these designations have become less firm. The class 5 switch was the closest to the end subscriber. Technology has distributed technology closer to the end user, diffusing traditional definitions of network switching hierarchies and the class of switches. |
| telecommunications carrier | A LEC, a CLEC, an IXC, an Enhanced Service Provider (ESP), an intelligent peripheral (IP), an international/global point-of-presence (GPOP), i.e., any provider of telecommunications services. |
| transmission control protocol (TCP) | TCP is an end-to-end protocol that operates at the transport and sessions layers of OSI, providing delivery of data bytes between processes running in host computers via separation and sequencing of IP packets. |
| transmission control protocol/internet protocol (TCP/IP) | TCP/IP is a protocol that provides communications between interconnected networks. The TCP/IP protocol is widely used on the Internet, which is a network comprising several large networks connected by high-speed connections. |
| trunk | A trunk connects an access tandem (AT) to an end office (EO). |
| wide area network (WAN) | A WAN is a data network that extends a LAN over the circuits of a telecommunications carrier. The carrier is typically a common carrier. A bridging switch or a router is used to connect the LAN to the WAN. |

Introduction

Exemplary Telecommunications Network

Voice Network

Simple Voice Network

FIG. 1 is a block diagram providing an overview of a standard telecommunications network 100 providing local exchange carrier (LEC) services within one or more local access and transport areas (LATAs). Telecommunications network 100 can provide a switched voice connection from a calling party 102 to a called party 110. FIG. 1 is shown to also include a private branch exchange 112 which can provide multiple users access to LEC services by, e.g., but not limited to, a private line, and/or facilities. Calling party 102 and called party 110 can be ordinary telephone equipment, key telephone systems, a private branch exchange (PBX) 112, or applications running on a host computer. Network 100 can be used for modem access as a data connection from calling party 102 to, for example, an Internet service provider (ISP) (not shown). Network 100 can also be used for access to, e.g., but not limited to, a private data network. For example, calling party 102 can be an employee working on a notebook computer at a remote location who is accessing his employer's private data network through, for example, a dial-up modem connection.

FIG. 1 includes end offices (EOs) 104 and 108. EO 104 is called an ingress EO because it provides a connection from calling party 102 to public switched telephone network (PSTN) facilities. EO 108 is called an egress EO because it provides a connection from the PSTN facilities to a called party 110. In addition to ingress EO 104 and egress EO 108, the PSTN facilities associated with telecommunications network 100 include an access tandem (AT) (not shown) at points of presence (POPs) 132 and 134 that can provide access to, e.g., one or more inter-exchange carriers (IXCs) 106 for long distance traffic, see FIG. 2. Alternatively, it would be apparent to a person having ordinary skill in the art that IXC 106 could also be, for example, a CLEC, or other enhanced service provider (ESP), an international gateway or global point-of-presence (GPOP), or an intelligent peripheral (IP).

FIG. 1 also includes a private branch exchange (PBX) 112 coupled to EO 104. PBX 112 couples calling parties 124 and 126, fax 116, client computer 118 and associated modem 130, and local area network 128 having client computer 120 and server computer 122 coupled via an associated modem 130. PBX 112 is a specific example of a general class of telecommunications devices located at a subscriber site, commonly referred to as customer premises equipment (CPE).

Network 100 also includes a common channel interactive signaling (CCIS) network for call setup and call tear down. Specifically, FIG. 1 includes a Signaling System 7 (SS7) signaling network 114.

Detailed Voice Network

Figure 2:
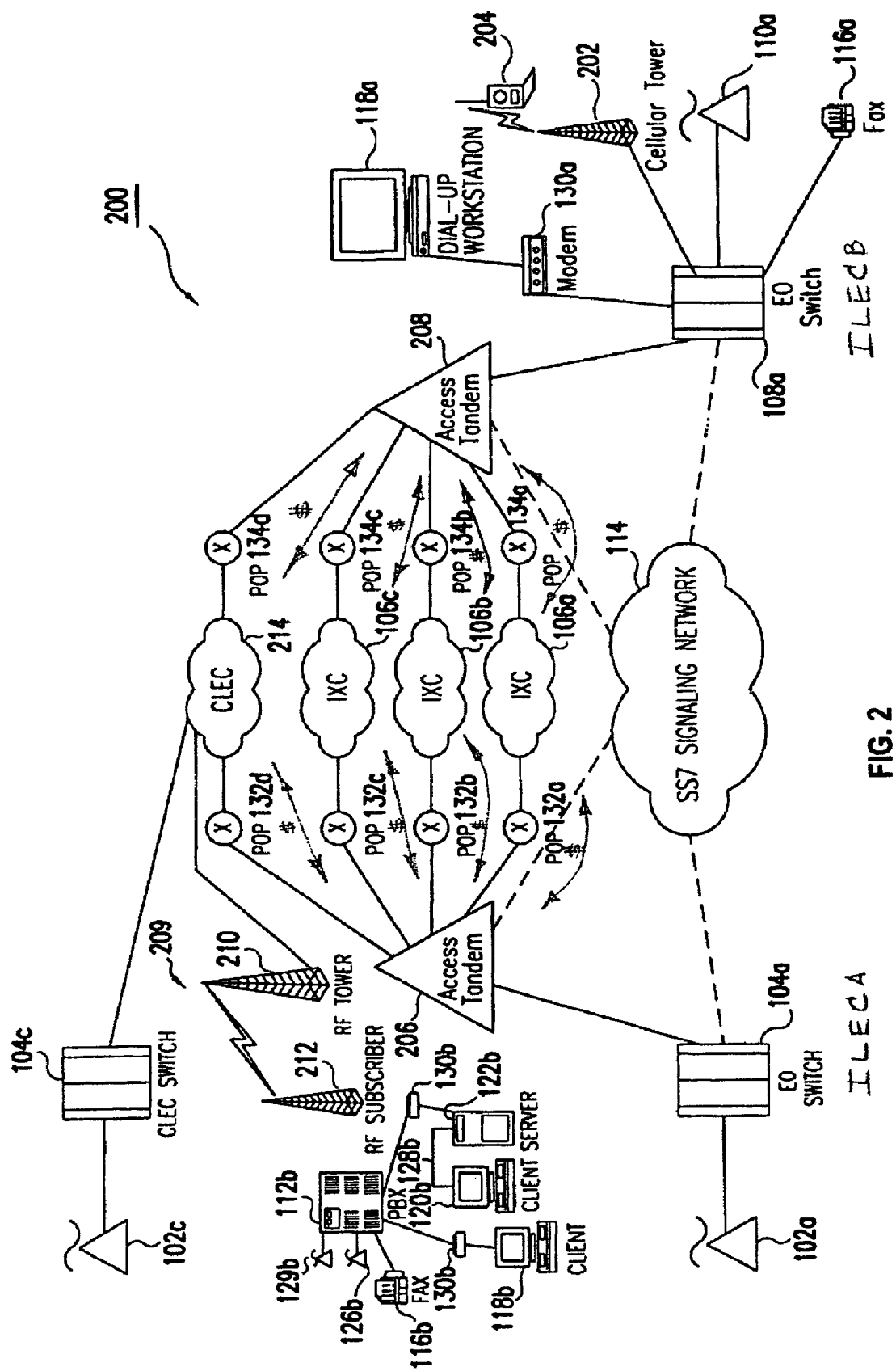
FIG. 2 is an exemplary embodiment of a block diagram illustrating an exemplary overview of a telecommunications network providing both local exchange carrier (LEC) and interexchange carrier (IXC) services between subscribers located in different local access and transport areas (LATAs)

FIG. 2 is a block diagram illustrating an overview of a standard telecommunications network 200, providing both LEC and IXC carrier services between subscribers located in different LATAs. Telecommunications network 200 is a more detailed version of telecommunications network 100. Calling party 102a and called party 110a are coupled to EO switches 104a and 108a, respectively. In other words, calling party 102a is homed to ingress EO 104a in a first LATA, whereas called party 110a is homed to an egress EO 108a in a second LATA. Calls between subscribers in different LATAs are long distance calls that are typically routed to IXCs. Sample IXCs in the United States include AT&T, MCI and Sprint.

Telecommunications network 200 includes access tandems (AT) 206 and 208. AT 206 provides connection to points of presence (POPs) 132a, 132b, 132c and 132d. IXCs 106a, 106b and 106c provide connection between POPs 132a, 132b and 132c (in the first LATA) and POPs 134a, 134b and 134c (in the second LATA). Competitive local exchange carrier (CLEC) 214 provides an alternative connection between POP 132d and POP 134d. POPs 134a, 134b, 134c and 134d, in turn, are connected to AT 208, which provides connection to egress EO 108a. Called party 110a can receive calls from EO 108a, which is its homed EO.

Alternatively, it would be apparent to a person having ordinary skill in the art that an AT 206 can also be, for example, a CLEC, or other enhanced service provider (ESP), an international gateway or global point-of-presence (GPOP), or an intelligent peripheral.

Network 200 also includes calling party 102c homed to CLEC switch 104c. Following the 1996 Telecommunications Act in the U.S., CLECs gained permission to compete for access within the local RBOCs territory. RBOCs are commonly referred to as incumbent local exchange carriers (ILECs).

Network 200 further may include a fixed wireless CLEC 209. Fixed wireless CLEC 209 includes a wireless transceiver/receiver radio frequency (RF) tower 210 in communication over an RF link to a subscriber transceiver RF tower 212. Subscriber RF tower 212 is depicted coupled to a CPE box, PBX 112b. PBX 112b couples calling parties 124b and 126b, fax 116b, client computer 118b and associated modem 130b, and local area network 128b having client computer 120b and server computer 122b coupled via an associated modem 130b.

Network 200 also includes called party 110a, a fax 116a, client computer 118a and associated modem 130a, and cellular communications RF tower 202 and associated cellular subscriber called party 204, all coupled to EO 108a, as shown.

EO 104a, 108a and AT 206, 208 are part of a switching hierarchy. EO 104a is known as a class 5 office and AT 208 is a class 3/4 office switch. Prior to the divestiture of the regional Bell Operating Companies (RBOCs) from AT&T following the modified final judgment, an office classification was the number assigned to offices according to their hierarchical function in the U.S. public switched network (PSTN). An office class is a functional ranking of a telephone central office switch depending on transmission requirements and hierarchical relationship to other switching centers. A class 1 office was known as a Regional Center (RC), the highest level office, or the "office of last resort" to complete a call. A class 2 office was known as a Sectional Center (SC). A class 3 office was known as a Primary Center (PC). A class 4 office was known as either a Toll Center (TC) if operators were present, or otherwise as a Toll Point (TP). A class 5 office was an End Office (EO), i.e., a local central office, the lowest level for local and long distance switching, and was the closest to the end subscriber. Any one center handles traffic from one or more centers lower in the hierarchy. Since divestiture and with more intelligent software in switching offices, these designations have become less firm. Technology has distributed functionality closer to the end user, diffusing traditional definitions of network hierarchies and the class of switches.

Exemplary arrows are depicted illustrating exemplary invoice charges that may flow between different exemplary entities. For example, but not limited to, exemplary telecommunications charges, which may include, e.g., intercarrier charges may include, e.g., but without limitation, in exemplary embodiments, call detail records (CDRs), facility cost records (FCRs), voice over Internet Protocol (VoIP) records, packet records, wireless, content, ringtone, audio, video, broadcast, and other usage, facility and other charges. Charges on invoices may relate, e.g., but not limited to, to carriers charges, Internet service provider (ISP) charges, VoIP charges, wireless charges, content provider charges, music company charges, video company charges, broadcast content charges, alert charges, packet charges, and any other fixed and/or variable fee charges which may be included in an invoice.

Connectivity to Internet Service Providers (ISPs)

In addition to providing a voice connection from calling party 102a to called party 110a, the PSTN can provide calling party 102a a data connection to an ISP (i.e. similar to client 118b).

Network 200 can also include an Internet service provider (ISP) (not shown) which could include a server computer 122 coupled to a data network 142 as will be discussed further below with reference to FIG. 3. The Internet is a well-known, worldwide network comprising several large networks connected together by data links. These links can include, for example, Integrated Digital Services Network (ISDN), T1, T3, FDDI and SONET links. Alternatively, an internet can be a private network interconnecting a plurality of LANs and/or WANs, such as, for example, an intranet. An ISP can provide Internet access services for subscribers such as client 118b.

To establish a connection with an ISP, client 118b can use a host computer connected to a modem (modulator/demodulator) 130b. The modem can modulate data from the host computer into a form (traditionally an analog form) for transmission to the LEC facilities. Typically, the LEC facilities convert the incoming analog signal into a digital form. In one embodiment, the data is converted into the point-to-point protocol (PPP) format. (PPP is a well-known protocol that permits a computer to establish a connection with the Internet using a standard modem. It supports high-quality, graphical user-interfaces.) As those skilled in the art will recognize, other formats are available, including, e.g., a transmission control program, internet protocol (TCP/IP) packet format, a user datagram protocol, internet protocol (UDP/IP) packet format, an asynchronous transfer mode (ATM) cell packet format, a serial line interface protocol (SLIP) protocol format, a point-to-point (PPP) protocol format, a point-to-point tunneling protocol (PPTP) format, a NETBIOS extended user interface (NETBEUI) protocol format, an Appletalk protocol format, a DECnet, BANYAN/VINES, an internet packet exchange (IPX) protocol format, and an internet control message protocol (ICMP) protocol format.

Although perhaps not shown, the exemplary embodiments of the present invention are equally applicable to any of, e.g., but not limited to, circuit switched, packet switched, wired line, wireless, cable TV (CATV), voice over power line, etc. networks, whether voice based, cell based, analog, digital, personal area, local area, and/or wide area networks, music, video, audio, movie, broadcast, digital and analog contents.

Communications Links

Note that FIGS. 1, 2 and other figures described herein include lines which may refer to communications lines or which may refer to logical connections between network nodes, or systems, which are physically implemented by telecommunications carrier devices. These carrier devices include circuits and network nodes between the circuits including, for example, digital access and cross-connect system (DACS), regenerators, tandems, copper wires, and fiber optic cable. It would be apparent to persons having ordinary skill in the art that alternative communications lines can be used to connect one or more telecommunications systems devices. Also, a telecommunications carrier as defined here, can include, for example, a LEC, a CLEC, an IXC, an Enhanced Service Provider (ESP), a global or international services provider such as a global point-of-presence (GPOP), and an intelligent peripheral.

EO 104a and AT 206 are connected by a trunk. A trunk connects an AT to an EO. A trunk can be called an inter machine trunk (IMT). AT 208 and EO 108a are connected by a trunk which can be an IMT.

Referring to FIG. 1, EO 104 and PBX 112 can be connected by a private line with a dial tone. A private line can also connect an ISP (not shown) to EO 104, for example. A private line with a dial tone can be connected to a modem bay or access converter equipment at the ISP. Examples of a private line are a channelized T1 or integrated services digital network (ISDN) primary rate interface (PRI). An ISP can also attach to the Internet by means of a pipe or dedicated communications facility. A pipe can be a dedicated communications facility. A private line can handle data modem traffic to and from an ISP.

Trunks can handle switched voice traffic and data traffic. For example, trunks can include digital signals DS1-DS4 transmitted over T1-T4 carriers. Table 5 provides typical carriers, along with their respective digital signals, number of channels, and bandwidth capacities.

TABLE 5

| Digital signal | Number of channels | Designation of carrier | Bandwidth in Megabits per second (Mbps) |
|---|---|---|---|
| DS0 | 1 | None | 0.064 |
| DS1 | 24 | T1 | 1.544 |
| DS2 | 96 | T2 | 6.312 |
| DS3 | 672 | T3 | 44.736 |
| DS4 | 4032 | T4 | 274.176 |

Alternatively, trunks can include optical carriers (OCs), such as OC-1, OC-3, etc. Table 6 provides typical optical carriers, along with their respective synchronous transport signals (STSs), ITU designations, and bandwidth capacities.

TABLE 6

| Optical carrier (OC) signal | Electrical signal, or synchronous transport signal (STS) | International Telecommunications Union (ITU) terminology | Bandwidth in Megabits per second (Mbps) |
|---|---|---|---|
| OC-1 | STS-1 | | 51.84 |
| OC-3 | STS-3 | STM-1 | 155.52 |
| OC-9 | STS-9 | STM-3 | 466.56 |
| OC-12 | STS-12 | STM-4 | 622.08 |
| OC-18 | STS-18 | STM-6 | 933.12 |
| OC-24 | STS-24 | STM-8 | 1244.16 |
| OC-36 | STS-36 | STM-12 | 1866.24 |
| OC-48 | STS-48 | STM-16 | 2488.32 |

As noted, a private line is a connection that can carry data modem traffic. A private line can be a direct channel specifically dedicated to a customer's use between two specified points. A private line can also be known as a leased line. In one embodiment, a private line is an ISDN/primary rate interface (ISDN PRI) connection. An ISDN PRI connection can include a single signal channel (called a data or D channel) on a T1, with the remaining 23 channels being used as bearer or B channels. (Bearer channels are digital channels that bear voice and data information.) If multiple ISDN PRI lines are used, the signaling for all of the lines can be carried over a single D channel, freeing up the remaining lines to carry only bearer channels.

Telecommunications Traffic

Telecommunications traffic can be sent and received from any network node of a telecommunications carrier. A telecommunications carrier can include, for example, a LEC, a CLEC, an IXC, and an Enhanced Service Provider (ESP). In an embodiment, this traffic can be received from a network node which is, for example, a class 5 switch, such as EO 104a, or from a class 3/4 switch, such as AT 206. Alternatively, the network system can also be, for example, a CLEC, or other enhanced service provider (ESP), an international gateway or global point-of-presence (GPOP), or an intelligent peripheral.

Voice traffic refers, for example, to a switched voice connection between calling party 102a and called party 110a. It is important to note that this is on a point-to-point dedicated path, i.e., that bandwidth is allocated whether it is being used or not. A switched voice connection is established between calling party 102a and EO 104a, then to AT 206 then over an IXC's network such as that of IXC 106a to AT 208 and then to EO 108a and over a trunk to called party 110a. In another embodiment, AT 206 or IXC 106a can also be, for example, a CLEC, or other enhanced service provider (ESP), an international gateway or global point-of-presence (GPOP), or an intelligent peripheral.

It is possible that calling party 102a is a computer with a data connection to a server over the voice network. Data traffic refers, for example, to a data connection between a calling party 102a (using a modem) and a server 122b that could be part of an ISP. A data connection can be established, e.g., between calling party 102a and EO 104a, then to AT 206, then to CLEC 214, then over a fixed wireless CLEC 209 link to PBX 112b to a modem 130b associated with server 122b.

Figure 3:
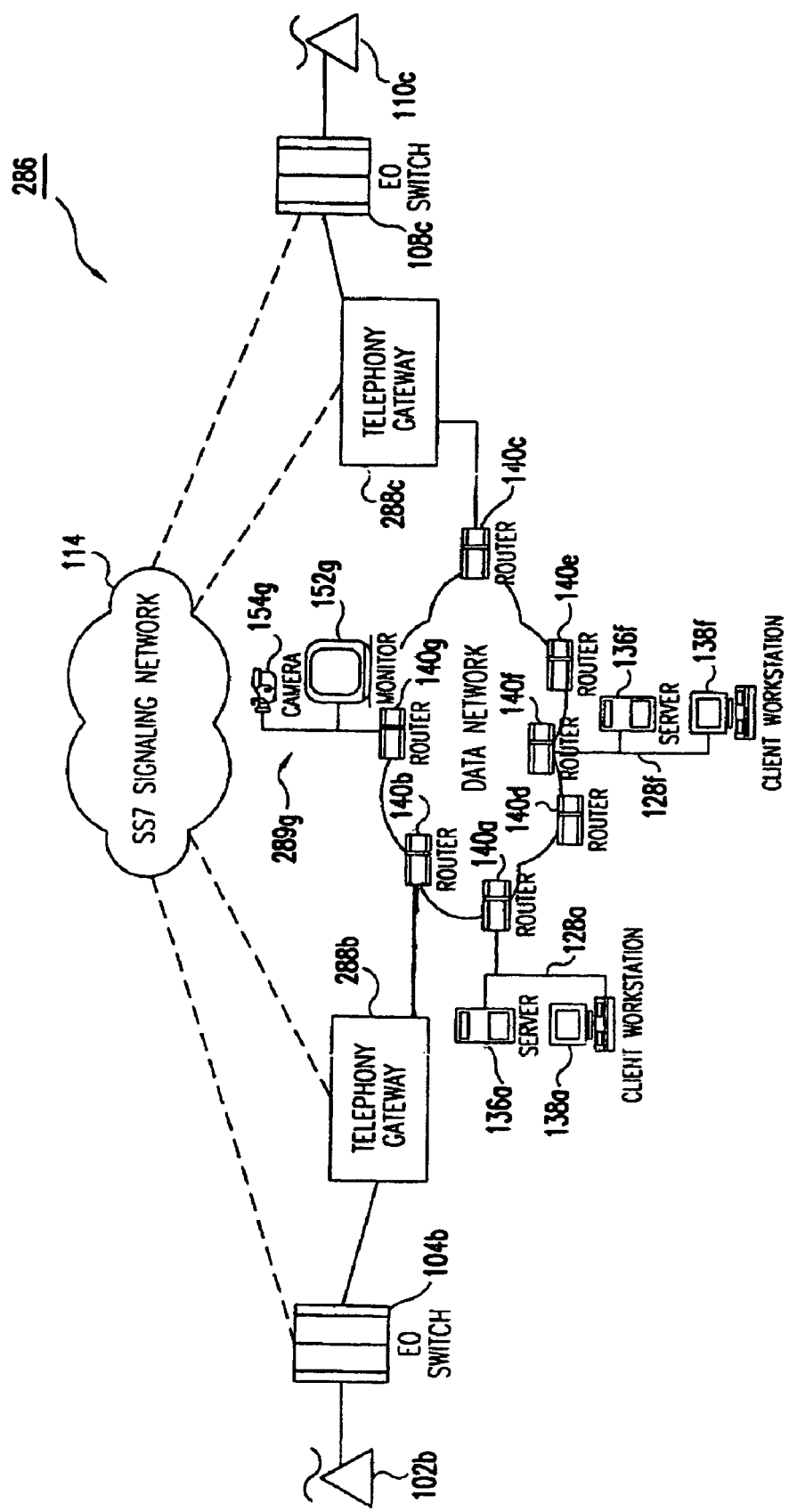
FIG. 3 illustrates an exemplary embodiment of a block diagram of an exemplary voice over data network providing what may be an exemplary competitive local exchange carrier (CLEC) service between subscribers.

A voice-over-Internet Protocol (VoIP) call may also be made and telephony and other data may be delivered over a data network as shown in FIG. 3.

SS7 Signaled Call Flow

To initiate a call in an SS7 telecommunications network, a calling party using a telephone connected to an ingress EO switch, dials a telephone number of a called party. The telephone number is passed from the telephone to the SSP at the ingress EO of the calling party's local exchange carrier (LEC). First, the SSP can process triggers and internal route rules based on satisfaction of certain criteria. Second, the SSP can initiate further signaling messages to another EO or access tandem (AT), if necessary. The signaling information can be passed from the SSP to STPs, which route the signals between the ingress EO and the terminating end office, or egress EO. The egress EO has a port designated by the telephone number of the called party. The call is set up as a direct connection between the EOs through tandem switches if no direct trunking exists or if direct trunking is full. If the call is a long distance call, i.e., between a calling party and a called party located in different local access transport areas (LATAs), then the call is connected through an inter exchange carrier (IXC) switch. Such a long distance call is commonly referred to as an inter-LATA call. LECs and IXCs are collectively referred to as the public switched telephone network (PSTN).

An Exemplary Computer System

Figure 5:
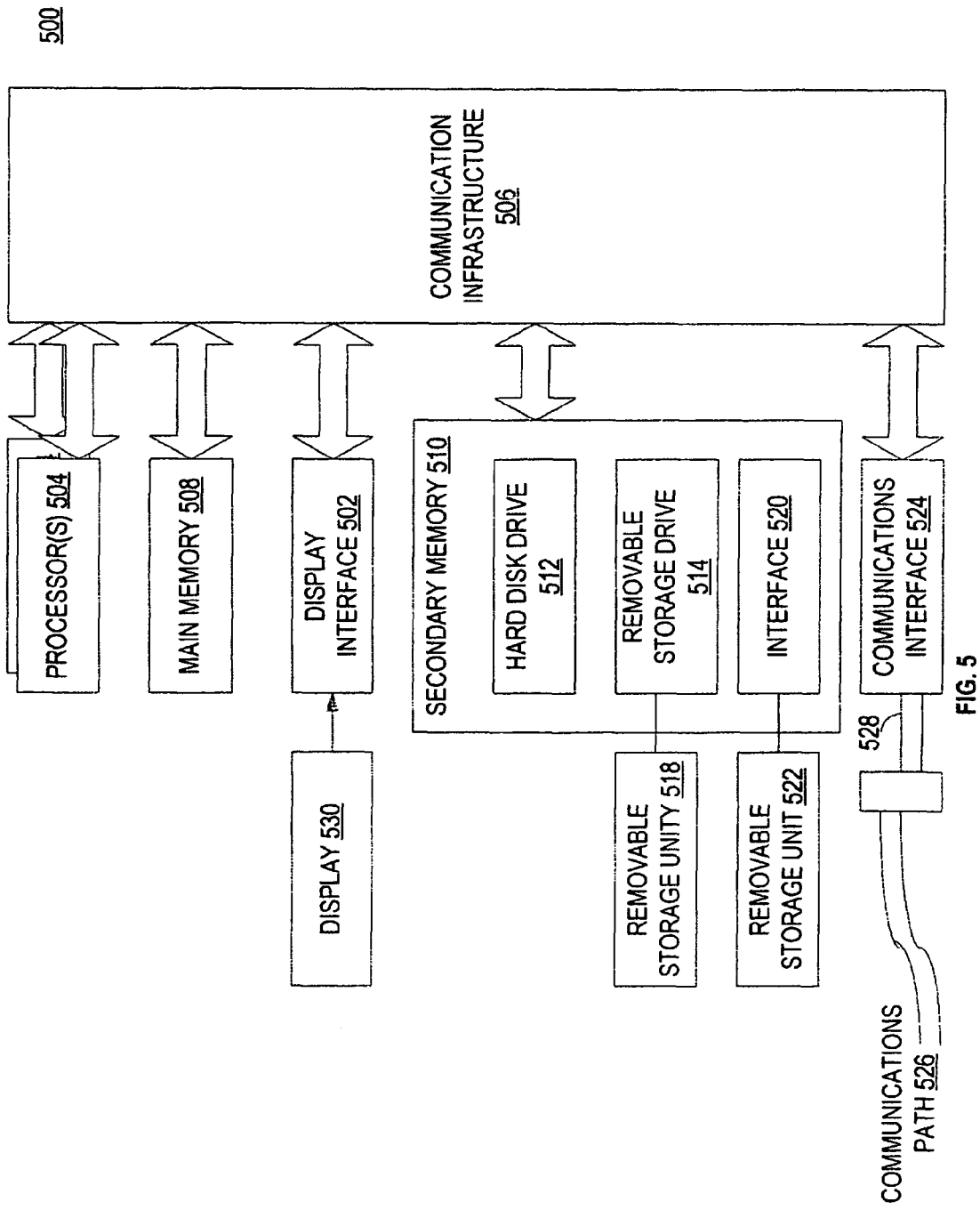
FIG. 5 depicts an exemplary embodiment of a computer system that may be used in computing devices such as, e.g., client and/or server devices according to an exemplary embodiment of the present invention.

FIG. 5 depicts an exemplary embodiment of a computer system that may be used in computing devices such as, e.g., but not limited to, client or server devices according to an exemplary embodiment of the present invention. FIG. 5 depicts an exemplary embodiment of a computer system that may be used as client device 102, or a server device 104, etc. The present invention (or any part(s) or function(s) thereof) may be implemented using hardware, software, firmware, or a combination thereof and may be implemented in one or more computer systems or other processing systems. In fact, in one exemplary embodiment, the invention may be directed toward one or more computer systems capable of carrying out the functionality described herein. An example of a computer system 500 is shown in FIG. 5, depicting an exemplary embodiment of a block diagram of an exemplary computer system useful for implementing the present invention. Specifically, FIG. 5 illustrates an example computer 500, which in an exemplary embodiment may be, e.g., (but not limited to) a personal computer (PC) system running an operating system such as, e.g., (but not limited to) WINDOWS MOBILE™ for POCKET PC, or MICROSOFT® WINDOWS® NT/98/2000/XP/CE/, etc. available from MICROSOFT® Corporation of Redmond, Wash., U.S.A., SOLARIS® from SUN® Microsystems of Santa Clara, Calif., U.S.A., OS/2 from IBM® Corporation of Armonk, N.Y., U.S.A., Mac/OS from APPLE® Corporation of Cupertino, Calif., U.S.A., etc., or any of various versions of UNIX® (a trademark of the Open Group of San Francisco, Calif., USA) including, e.g., LINUX®, HPUX®, IBM AIX®, and SCO/UNIX®, etc. However, the invention may not be limited to these platforms. Instead, the invention may be implemented on any appropriate computer system running any appropriate operating system. In one exemplary embodiment, the present invention may be implemented on a computer system operating as discussed herein. An exemplary computer system, computer 500 is shown in FIG. 5. Other components of the invention, such as, e.g., (but not limited to) a computing device, a communications device, a telephone, a personal digital assistant (PDA), a personal computer (PC), a handheld PC, client workstations, thin clients, thick clients, proxy servers, network communication servers, remote access devices, client computers, server computers, routers, web servers, data, media, audio, video, telephony or streaming technology servers, etc., may also be implemented using a computer such as that shown in FIG. 5.

The computer system 500 may include one or more processors, such as, e.g., but not limited to, processor(s) 504. The processor(s) 504 may be connected to a communication infrastructure 506 (e.g., but not limited to, a communications bus, cross-over bar, or network, etc.). Various exemplary software embodiments may be described in terms of this exemplary computer system. After reading this description, it will become apparent to a person skilled in the relevant art(s) how to implement the invention using other computer systems and/or architectures.

Computer system 500 may include a display interface 502 that may forward, e.g., but not limited to, graphics, text, and other data, etc., from the communication infrastructure 506 (or from a frame buffer, etc., not shown) for display on the display unit 530.

The computer system 500 may also include, e.g., but may not be limited to, a main memory 508, random access memory (RAM), and a secondary memory 510, etc. The secondary memory 510 may include, for example, (but not limited to) a hard disk drive 512 and/or a removable storage drive 514, representing a floppy diskette drive, a magnetic tape drive, an optical disk drive, a compact disk drive CD-ROM, etc. The removable storage drive 514 may, e.g., but not limited to, read from and/or write to a removable storage unit 518 in a well known manner. Removable storage unit 518, also called a program storage device or a computer program product, may represent, e.g., but not limited to, a floppy disk, magnetic tape, optical disk, compact disk, etc. which may be read from and written to by removable storage drive 514. As will be appreciated, the removable storage unit 518 may include a computer usable storage medium having stored therein computer software and/or data.

In alternative exemplary embodiments, secondary memory 510 may include other similar devices for allowing computer programs or other instructions to be loaded into computer system 500. Such devices may include, for example, a removable storage unit 522 and an interface 520. Examples of such may include a program cartridge and cartridge interface (such as, e.g., but not limited to, those found in video game devices), a removable memory chip (such as, e.g., but not limited to, an erasable programmable read only memory (EPROM), or programmable read only memory (PROM) and associated socket, and other removable storage units 522 and interfaces 520, which may allow software and data to be transferred from the removable storage unit 522 to computer system 500.

Computer 500 may also include an input device such as, e.g., (but not limited to) a mouse or other pointing device such as a digitizer, and a keyboard or other data entry device (none of which are labeled).

Computer 500 may also include output devices, such as, e.g., (but not limited to) display 530, and display interface 502. Computer 500 may include input/output (I/O) devices such as, e.g., (but not limited to) communications interface 524, cable 528 and communications path 526, etc. These devices may include, e.g., but not limited to, a network interface card, and modems (neither are labeled). Communications interface 524 may allow software and data to be transferred between computer system 500 and external devices. Examples of communications interface 524 may include, e.g., but may not be limited to, a modem, a network interface (such as, e.g., an Ethernet card), a communications port, a Personal Computer Memory Card International Association (PCMCIA) slot and card, etc. Software and data transferred via communications interface 524 may be in the form of signals 528 which may be electronic, electromagnetic, optical or other signals capable of being received by communications interface 524. These signals 528 may be provided to communications interface 524 via, e.g., but not limited to, a communications path 526 (e.g., but not limited to a channel). This channel 526 may carry signals 528, which may include, e.g., but not limited to, propagated signals, and may be implemented using, e.g., but not limited to, wire or cable, fiber optics, a telephone line, a cellular link, an radio frequency (RF) link and other communications channels, etc.

In this document, the terms "computer program medium" and "computer readable medium" may be used to generally refer to media such as, e.g., but not limited to removable storage drive 514, a hard disk installed in hard disk drive 512, etc. These computer program products may provide software to computer system 500 The invention may be directed to such computer program products.

References to "one embodiment," "an embodiment," "example embodiment," "various embodiments," etc., may indicate that the embodiment(s) of the invention so described may include a particular feature, structure, or characteristic, but not every embodiment necessarily includes the particular feature, structure, or characteristic. Further, repeated use of the phrase "in one embodiment," or "in an exemplary embodiment," do not necessarily refer to the same embodiment, although they may.

In the following description and claims, the terms "coupled" and "connected," along with their derivatives, may be used. It should be understood that these terms are not intended as synonyms for each other. Rather, in particular embodiments, "connected" may be used to indicate that two or more elements are in direct physical or electrical contact with each other. "Coupled" may mean that two or more elements are in direct physical or electrical contact. However, "coupled" may also mean that two or more elements are not in direct contact with each other, but yet still co-operate or interact with each other.

An algorithm is here, and generally, considered to be a self-consistent sequence of acts or operations leading to a desired result. These include physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like. It should be understood, however, that all of these and similar terms are to be associated with the appropriate physical quantities and are merely convenient labels applied to these quantities.

Unless specifically stated otherwise, as apparent from the following discussions, it is appreciated that throughout the specification discussions utilizing terms such as "processing," "computing," "calculating," "determining," or the like, refer to the action and/or processes of a computer or computing system, or similar electronic computing device, that manipulate and/or transform data represented as physical, such as electronic, quantities within the computing system's registers and/or memories into other data similarly represented as physical quantities within the computing system's memories, registers or other such information storage, transmission or display devices.

In a similar manner, the term "processor" may refer to any device or portion of a device that processes electronic data from registers and/or memory to transform that electronic data into other electronic data that may be stored in registers and/or memory. A "computing platform" may comprise one or more processors.

Embodiments of the present invention may include apparatuses for performing the operations herein. An apparatus may be specially constructed for the desired purposes, or it may comprise a general purpose device selectively activated or reconfigured by a program stored in the device.

Embodiments of the invention may be implemented in one or a combination of hardware, firmware, and software. Embodiments of the invention may also be implemented as instructions stored on a machine-readable medium, which may be read and executed by a computing platform to perform the operations described herein. A machine-readable medium may include any mechanism for storing or transmitting information in a form readable by a machine (e.g., a computer). For example, a machine-readable medium may include read only memory (ROM); random access memory (RAM); magnetic disk storage media; optical storage media; flash memory devices; and others.

Computer programs (also called computer control logic), may include object oriented computer programs, and may be stored in main memory 508 and/or the secondary memory 510 and/or removable storage units 514, also called computer program products. Such computer programs, when executed, may enable the computer system 500 to perform the features of the present invention as discussed herein. In particular, the computer programs, when executed, may enable the processor 504 to provide a method to resolve conflicts during data synchronization according to an exemplary embodiment of the present invention. Accordingly, such computer programs may represent controllers of the computer system 500.

In another exemplary embodiment, the invention may be directed to a computer program product comprising a computer readable medium having control logic (computer software) stored therein. The control logic, when executed by the processor 504, may cause the processor 504 to perform the functions of the invention as described herein. In another exemplary embodiment where the invention may be implemented using software, the software may be stored in a computer program product and loaded into computer system 500 using, e.g., but not limited to, removable storage drive 514, hard drive 512 or communications interface 524, etc. The control logic (software), when executed by the processor 504, may cause the processor 504 to perform the functions of the invention as described herein. The computer software may run as a standalone software application program running atop an operating system, or may be integrated into the operating system.

In yet another embodiment, the invention may be implemented primarily in hardware using, for example, but not limited to, hardware components such as application specific integrated circuits (ASICs), or one or more state machines, etc. Implementation of the hardware state machine so as to perform the functions described herein will be apparent to persons skilled in the relevant art(s).

In another exemplary embodiment, the invention may be implemented primarily in firmware.

In yet another exemplary embodiment, the invention may be implemented using a combination of any of, e.g., but not limited to, hardware, firmware, and software, etc.

While various embodiments of the present invention have been described above, it should be understood that they have been presented by way of example only, and not limitation. Thus, the breadth and scope of the present invention should not be limited by any of the above-described exemplary embodiments, but should instead be defined only in accordance with the following claims and their equivalents.

What is claimed is:

1. A method comprising:
receiving by at least one computer a telecommunications invoice data stream in a first data format;
analyzing by the at least one computer said telecommunications invoice data stream to determine said first data format;
modeling by the at least one computer said telecommunications invoice data stream to generate a modeled telecommunications invoice data stream;
mapping by the at least one computer said modeled telecommunications invoice data stream to a normalized data format to generate a normalized, mapped, and modeled telecommunications invoice data stream; and
providing by the at least one computer said normalized, mapped, and modeled telecommunications invoice data stream for auditing, by the at least one computer, for billing accuracy, comprising at least one of:
validating fields,
validating invoice data,
validating numerical accuracy,
validating expected field lengths,
validating contractual data,
validating billing access number, validating phone number,
validating call data,
validating mileage characteristics,
validating rate charges, or
validating throughput characteristics.

2. The method according to claim 1, wherein said modeling of said telecommunications invoice data stream further comprises at least one of:
creating by the at least one computer a model for said first data format;
modeling by the at least one computer said telecommunications invoice data stream according to said model; or
modeling by the at least one computer said telecommunications invoice data stream with an intelligent adapter.

3. The method according to claim 1, further comprising:
validating by the at least one computer said parsed data by comparing a first telecommunications invoice generated from said telecommunications invoice data stream in said first data format with a second telecommunications invoice generated from said mapped telecommunications invoice data stream.

4. The method according to claim 1, further comprising:
auditing said telecommunications invoice data stream for billing accuracy comprising:
comparing, by the at least one computer, at least one calculated telecommunications invoice charge included in said telecommunications invoice data stream with a telecommunications invoice field included in said telecommunications invoice data stream; and
confirming field integrity by the at least one computer.

5. The method according to claim 1, wherein said receiving said telecommunications invoice data stream comprises receiving at least one of a non-industry standard data format or a captured electronic print data file.

6. The method according to claim 5, wherein said receiving comprises receiving said captured electronic print data file and comprising capturing at a remote site.

7. The method according to claim 1, wherein said receiving said telecommunications invoice data stream comprises receiving a telephone electronic print data file of a telecommunications invoice.

8. The method according to claim 1, wherein said receiving said telecommunications invoice data stream comprises receiving a telephone company telecommunications invoice data stream.

9. The method according to claim 1, wherein said analyzing to determine said first data format comprises analyzing to determine whether said first data format comprises at least one of a non-industry standard data file, a PDF file, a PRN file, an LPT file, or a TIFF file.

10. The method according to claim 1, wherein said mapping to said normalized data format comprises mapping to at least one of an XTrak interchange format (xif), an extensible markup language (xml) format, an industry standard format, or a proprietary format.

11. The method according to claim 1, wherein said step of mapping said modeled invoice data further comprises at least one of:
mapping by the at least one computer said modeled telecommunications invoice data stream according to mapping codes;
mapping by the at least one computer said modeled telecommunications invoice data stream with an intelligent adapter;
blending by the at least one computer a record into a record comprising a superset of fields of an industry standard record; or
mapping by the at least one computer said modeled telecommunications invoice data stream using fuzzy logic.

12. The method according to claim 1, wherein said receiving said telecommunications invoice data stream comprises receiving at a centralized site from a remote site.

13. The method according to claim 1, further comprising:
transmitting by the at least one computer said normalized, mapped, and modeled telecommunications invoice data stream to a centralized site from a remote site.

14. A machine-readable medium that provides instructions, which when executed by a at least one computing platform, cause said at least one computing platform to perform operations comprising a method comprising:
receiving a telecommunications invoice data stream in a first data format;
analyzing said telecommunications invoice data stream to determine said first data format;
modeling said telecommunications invoice data stream to generate a modeled telecommunications invoice data stream;
mapping said modeled telecommunications invoice data stream to a normalized data format to generate a normalized, mapped, and modeled telecommunications invoice data stream; and
providing by the at least one computer said normalized, mapped, and modeled telecommunications invoice data stream for auditing, by the at least one computer, for billing accuracy, comprising at least one of:
validating fields,
validating invoice data,
validating numerical accuracy,
validating expected field lengths,
validating contractual data,
validating billing access number,
validating phone number,
validating call data,
validating mileage characteristics,
validating rate charges, or
validating throughput characteristics.

15. The machine-readable medium according to claim 14, wherein said modeling of said telecommunications invoice data stream further comprises at least one of:
creating a model for said first data format;
blending a record into a record comprising a superset of fields of an industry standard record;
modeling said telecommunications invoice data stream according to said modeling model; or
modeling with an intelligent adapter said telecommunications invoice data stream.

16. The machine-readable medium according to claim 14, wherein the method further comprises:
validating said parsed data by comparing a first telecommunications invoice generated from said telecommunications invoice data stream in said first data format with a second telecommunications invoice generated from said mapped telecommunications invoice data stream.

17. The machine-readable medium according to claim 14, wherein the method further comprises:
auditing said telecommunications invoice data stream for billing accuracy comprising:
comparing at least one calculated telecommunications invoice charge included in said telecommunications invoice data stream with a telecommunications invoice field included in said telecommunications invoice data stream; and confirming field integrity.

18. The machine-readable medium according to claim 14, wherein said receiving said telecommunications invoice data stream comprises receiving at least one of a non-industry standard data format or a captured electronic print file.

19. The machine-readable medium according to claim 18, wherein said receiving comprises receiving said captured electronic print file and comprising capturing at a remote site.

20. The machine-readable medium according to claim 14, wherein said receiving said telecommunications invoice data stream comprises receiving a telephone electronic print file of a telecommunications invoice.

21. The machine-readable medium according to claim 14, wherein said receiving said telecommunications invoice data stream comprises receiving a telephone company telecommunications invoice data stream.

22. The machine-readable medium according to claim 14, wherein said analyzing to determine said first data format comprises analyzing to determine whether said first data format comprises at least one of a non-industry standard file, a PDF file, a PRN file, an LPT file, or a TIFF file.

23. The machine-readable medium according to claim 14, wherein said mapping to said normalized data format comprises mapping to at least one of an XTrak interchange format (xif), an extensible markup language (xml) format, an industry standard format, or a proprietary format.

24. The machine-readable medium according to claim 14, wherein said step of mapping said parsed invoice data further comprises at least one of:
mapping said modeled telecommunications invoice data stream according to mapping codes;
mapping said modeled telecommunications invoice data stream with an intelligent adapter;
blending a record into a record comprising a superset of fields of an industry standard record; or
mapping said modeled telecommunications invoice data stream using fuzzy logic.

25. The machine-readable medium according to claim 14, wherein said received telecommunications invoice data stream is received at a centralized site from a remote site.

26. The machine-readable medium according to claim 14, wherein the method further comprises:
transmitting said normalized, mapped, and modeled telecommunications invoice data stream to a centralized site from a remote site.

27. A system comprising:
receiving means for receiving a telecommunications invoice data stream in a first data format;
analyzing means for analyzing said telecommunications invoice data stream to determine said first data format;
modeling means for modeling said telecommunications invoice data stream to generate a modeled telecommunications invoice data stream;
mapping means for mapping said modeled telecommunications invoice data stream to a normalized data format to generate a normalized, mapped, and modeled telecommunication invoice data stream; and
providing means for providing said normalized, mapped, and modeled telecommunications invoice data stream to a means for auditing for billing accuracy, the means for auditing comprising at least one of:
means for validating fields,
means for validating invoice data,
means for validating numerical accuracy,
means for validating expected field lengths,
means for validating contractual data,
means for validating billing access number,
means for validating phone number,
means for validating call data,
means for validating mileage characteristics,
means for validating rate charges, or
means for validating throughput characteristics.

28. The system according to claim 27, wherein said modeling means further comprises at least one of:
means for creating a modeling model for said first data format;
means for modeling said telecommunications invoice data stream according to said modeling model;
means for blending a record into a record comprising a superset of fields of an industry standard record; or
means for modeling said telecommunications invoice data stream with an intelligent adapter.

29. The system according to claim 27, further comprising:
means for validating said parsed data by comparing a first telecommunications invoice generated from said telecommunications invoice data stream in said first data format with a second telecommunications invoice generated from said mapped telecommunications invoice data stream.

30. The system according to claim 27, further comprising:
means for auditing said telecommunications invoice data stream for billing accuracy comprising:
means for comparing at least one calculated telecommunications invoice charge included in said telecommunications invoice data stream with a telecommunications invoice field included in said telecommunications invoice data stream; and
means for confirming field integrity.

31. The system according to claim 27, wherein said received telecommunications invoice data stream comprises at least one of a non-industry standard data format or a captured electronic print file.

32. The system according to claim 31, wherein said captured electronic print file is captured at a remote site.

33. The system according to claim 27, wherein said telecommunications invoice data stream comprises a electronic print file of a telecommunications invoice.

34. The system according to claim 27, wherein said telecommunications invoice data stream comprises a company telecommunications invoice data stream.

35. The system according to claim 27, wherein said first data stream format comprises at least one of a non-industry standard format, a PDF file, a PRN file, an LPT file, or a TIFF file.

36. The system according to claim 27, wherein said second normalized data format comprises at least one of an XTrak interchange format (xif), an extensible markup language (xml) format, an industry standard format, or a proprietary format.

37. The system according to claim 27, wherein said mapping means further comprises at least one of:
means for mapping said modeled telecommunications invoice data stream according to mapping codes;
means for mapping said modeled telecommunications invoice data stream with an intelligent adapter; or
means for mapping said modeled telecommunications invoice data stream using fuzzy logic.

38. The system according to claim 27, wherein said received telecommunications invoice data stream is received at a centralized site from a remote site.

39. The system according to claim 27, further comprising:
means for transmitting said normalized, mapped, and modeled telecommunications invoice data stream to a centralized site from a remote site.

40. The method according to claim 1, wherein said first data format comprises at least one of:
usage records;
facilities records;
switched call records;
dedicated facilities records;
call detail records (CDRs);
facility cost records (FCRs);
voice over Internet Protocol (VoIP) records;
packet records;
content records;
ringtone records;
audio records;
video records;
broadcast records;
wireless records;
CATV records;
satellite records;
other usage records;
other facility records; or
other charge records.

41. A system comprising:
a computing device comprising at least one processor adapted to receive a telecommunications invoice data stream; to generate a normalized, mapped, and modeled telecommunications invoice data stream from said telecommunications invoice data stream; and to provide to at least one audit processor adapted to audit the normalized, mapped, and modeled telecommunications invoice data stream for billing accuracy, the audit processor adapted to validate at least one of:
fields,
invoice data,
numerical accuracy,
expected field lengths,
contractual data,
billing access number,
phone number,
call data,
mileage characteristics,
rate charges, or
throughput characteristics.

42. The method according to claim 4, wherein the auditing said telecommunications invoice data stream for billing accuracy further comprises at least one of:
confirming by the at least one computer numerical accuracy; or
confirming by the at least one computer expected field lengths.

43. The machine-readable medium according to claim 17, wherein the auditing said telecommunications invoice data stream for billing accuracy further comprises at least one of:
confirming numerical accuracy; or
confirming expected field lengths.

44. The system according to claim 30, further comprising at least one of:
means for confirming numerical accuracy; or
means for confirming expected field lengths.

\* \* \* \* \*